United States Patent [19]
Suzuka et al.

[11] Patent Number: 5,247,327
[45] Date of Patent: Sep. 21, 1993

[54] CAMERA HAVING OBJECT DISTANCE MEASURING DEVICE

[75] Inventors: Shinya Suzuka; Nobuhiro Himeno, both of Tokyo, Japan

[73] Assignee: Asahi Kogaku Kogyo Kabushiki Kaisha, Tokyo, Japan

[21] Appl. No.: 913,487

[22] Filed: Jul. 15, 1992

Related U.S. Application Data

[63] Continuation-in-part of Ser. No. 820,802, Jan. 15, 1992, abandoned.

[30] Foreign Application Priority Data

Jan. 17, 1991 [JP] Japan ................................. 3-04731
Mar. 20, 1991 [JP] Japan ................................. 3-083317
Mar. 19, 1992 [JP] Japan ................................. 4-063791

[51] Int. Cl.⁵ ..................... G03B 13/36; G03B 17/38
[52] U.S. Cl. ................................. 354/403; 354/408; 354/266
[58] Field of Search ............... 354/400, 402, 403, 412, 354/408, 266

[56] References Cited

U.S. PATENT DOCUMENTS

| | | | |
|---|---|---|---|
| 4,534,629 | 8/1985 | Bogle et al. | 354/400 |
| 4,601,557 | 7/1986 | Bogle et al. | 354/401 |
| 4,829,331 | 5/1989 | Aihara | 354/400 |
| 4,884,094 | 11/1989 | Kataura et al. | 354/412 |
| 4,951,075 | 8/1990 | Tokumaru et al. | 354/400 |
| 4,962,400 | 10/1990 | Otani et al. | 354/403 X |
| 4,998,125 | 3/1991 | Watanabe et al. | 354/403 |
| 5,014,080 | 5/1992 | Miyadera | 354/402 |
| 5,089,841 | 2/1992 | Yamada | 354/402 |

*Primary Examiner*—Michael L. Gellner
*Assistant Examiner*—Jae N. Noh
*Attorney, Agent, or Firm*—Sandler Greenblum & Bernstein

[57] ABSTRACT

A camera having a focusing function that is operable in accordance with distance data of an object to be photographed. The distance data is detected by using a measuring light. The camera includes a remote control unit that is separate from a camera body of the camera and which is actuated from an object side to emit measuring light toward the camera body. The camera also includes at least two light receivers to receive the measuring light emitted by the remote controller, a direction detector for detecting the direction of the measuring light received by the at least two light receivers, and a distance calculator for calculating distance data of the object in accordance with the direction of the measuring light detected by the direction detector.

47 Claims, 24 Drawing Sheets

CAMERA HAVING OBJECT DISTANCE MEASURING DEVICE

This application is a continuation-in-part of U.S. Pat. application Ser. No. 07/820,802, filed Jan. 15, 1992, abandoned Dec. 14, 1992, entitled "Camera Having Object Distance Measuring Device", the disclosure of which is expressly incorporated by reference herein in its entirety.

BACKGROUND OF THE INVENTION

1. Field of the Invention

The present invention relates to a camera having an object distance measuring device for measuring the distance of an object to be taken from a camera body.

2. Description of Related Art

A camera having an automatic focusing device usually includes an object distance measuring device which detects the distance of an object to be taken from the camera body. In a known object distance measuring device, measuring light, e.g., infrared light, is emitted from the camera body parallel with the optical axis of a taking lens system to be reflected by an object to be taken and then received by a light receiver, such as a silicon photo diode (which will be referred to as SPD hereinafter). The object distance may then be detected in accordance with the location of the received light on the surface of SPD, and the incident angle of the reflected light.

In such a known object that is distance measuring device, since the measuring light is emitted parallel to the optical axis of the taking lens system, it is possible to conduct distance measuring of an object located approximately at the center of a field of view of the taking lens system. If a main object to be taken is intentionally deviated from the center of the field of view of the taking lens system, distance measurement is effected for another object which is located at the center of the field of view of the taking lens system, so that an object other than the main object is in focus.

SUMMARY OF THE INVENTION

The primary object of the present invention is to provide a camera in which, when an object to be taken is in the field of view of the taking lens system, the distance of the main object can be detected regardless of the relative position of the object in the field of view.

To achieve the object mentioned above, according to the present invention, there is provided a camera in which a focusing function is operable in accordance with distance data of an object to be photographed, the distance data being detected by using a measuring light, the camera comprising, a remote controller that is separate from the camera body and which is capable of being actuated from the object side to emit measuring light towards the camera body, a light receiver that are to receive the measuring light emitted from the remote controller, means for detecting a direction of the measuring light received by the light receiver, and, means for calculating distance data of the object in accordance with the direction of the measuring light detected by the direction detecting means With this arrangement, since the object distance can be detected in accordance with the measuring light emitted from the object side, the distance of any object located within the field of view can be detected regardless of the relative position of the object.

If the taking lens is a zoom lens, the camera can further comprise a first focal length calculating means in the camera body for calculating a focal length of the zoom lens so as to locate the object to be taken within the angle of view of the zoom lens, in accordance with the distance data from the distance calculating means.

It is also possible to provide a second focal length calculating means in the camera body for calculating a focal length of the zoom lens so as to maintain a predetermined size of an image of the object with respect to a film, in accordance with the distance data from the distance calculating means, regardless of the distance of the object from the camera body.

Preferably, a zoom lens driving means is provided in the camera body to move the zoom lens in the direction of the optical axis thereof so as to obtain a predetermined focal length. In this case, the predetermined focal length is identical to the focal length calculated by the first focal length calculating means, or the focal length calculated by the second focal length calculating means.

Preferably, a focal length selecting means is further provided in the camera body to compare the focal length calculated by the first focal length calculating means and the focal length calculated by the second focal length calculating means to select one focal length which gives a wide angle of view of the zoom lens. In this case, the predetermined focal length is identical to the focal length selected by the focal length selecting means.

According to another aspect of the present invention, a focal length mode selecting means is provided in the camera body to select a mode in which the focal length of the zoom lens is the focal length calculated by the first focal length calculating means, a mode in which the focal length of the zoom lens is the focal length calculated by the second focal length calculating means, or a mode in which the focal length of the zoom lens is the focal length selected by the focal length selecting means.

In this aspect, the predetermined focal length is the focal length selected by the focal length mode selecting means.

Preferably, a taking mode selecting means is provided to select a mode in which the zoom lens is moved by the zoom lens driving means in the optical axis direction thereof or a mode in which the zoom lens is manually moved in the optical axis direction thereof.

Preferably, a warning means is provided to warn that object distance data is not being outputted from the distance calculating means within a predetermined time. The warning means can be comprised of a warning sound or light generator. If the light receiver can receive two bundles of rays emitted from a remote controller or remote controllers in different directions, the directions of the bundles of rays can be detected by the direction detecting means in accordance with the signals outputted from the remote controllers and received by the light receiver. As a result, the object distance data can be calculated by the distance calculating means in accordance with the direction data of the direction detecting means.

The light receiver can be made of CCD's or PSD's spaced from one another on right and left front wall portions of the camera body.

Furthermore, a provision is made for a position comparing means for judging whether the remote controller or remote controllers is (or are) the remote predetermined angle of view of the zoom lens, so that when one or both of the remote controllers is (or are) not within the predetermined angle of view of the zoom lens, the warning means warns a photographer of the condition, respectively.

The present disclosure relates to subject matter contained in Japanese utility model application No. HEI 3-4731 (filed on Jan. 17, 1991), Japanese patent application No. HEI 3-83317 (filed on Mar. 20, 1991), and Japanese patent application No. HEI 4-63791 (filed on Mar. 19, 1992), which are expressly incorporated herein by reference in their entirety.

BRIEF DESCRIPTION OF THE DRAWINGS

The invention will be explained below in detail with reference to the accompanying drawings, in which.

DETAILED DESCRIPTION OF THE PREFERRED EMBODIMENTS

Figure 1:
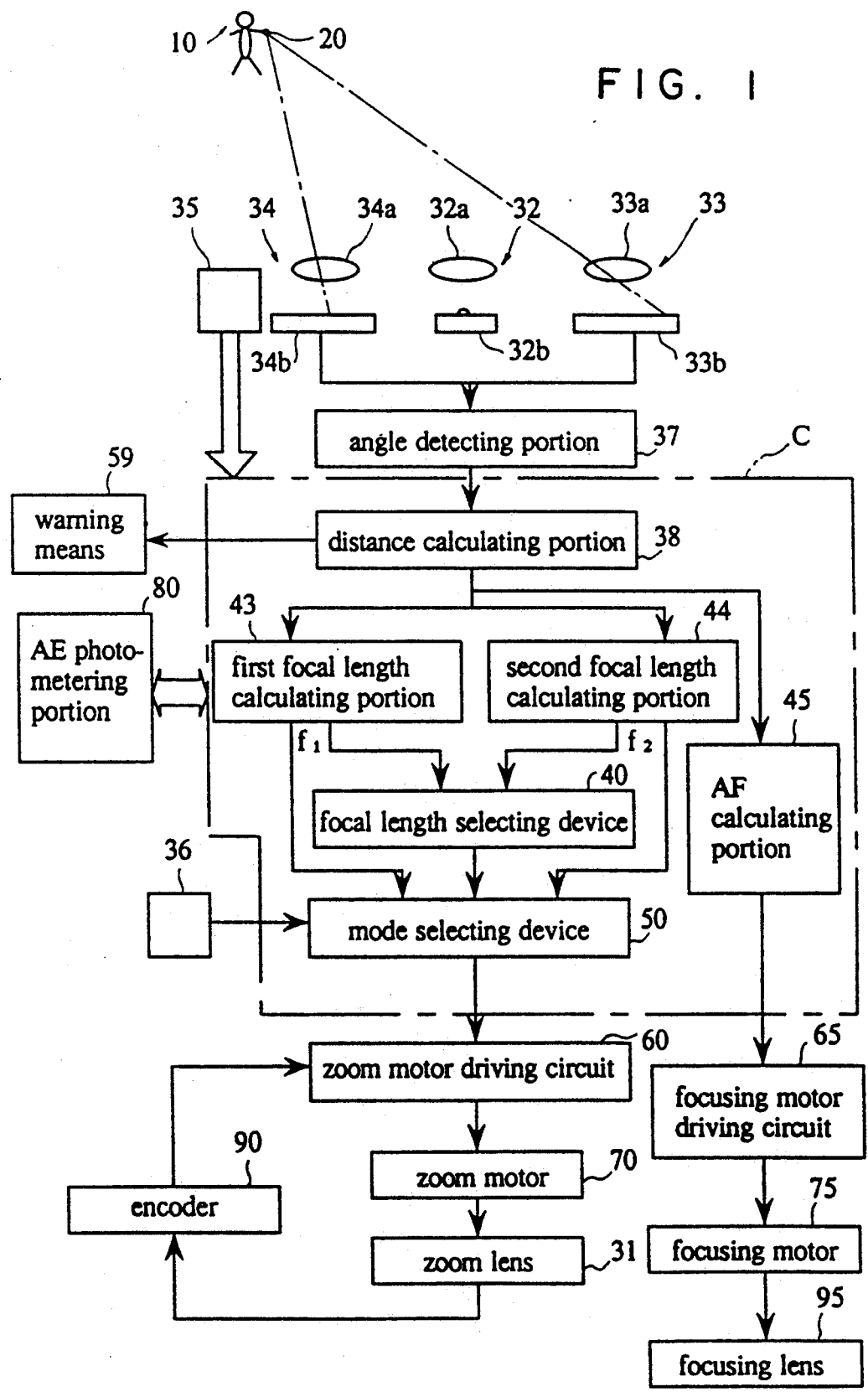
FIG. 1 is a block diagram of a camera having an object distance measuring device according to a first embodiment of the present invention.

FIG. 1 shows constituent components of a camera having an object distance measuring device according to a first embodiment of the present invention. A camera body 30 (FIG. 2) has a zoom lens (taking lens) 31 having a focusing lens 95, a measuring light emitter 32 which emits normal measuring light substantially parallel with optical axis O of the zoom lens 31, a first measuring light receiver 33, a second measuring light receiver 34, and a releasing light receiver 35.

The first measuring light receiver 33 receives normal measuring light which is emitted from the measuring light emitter 32 and which is reflected by the object to be taken 10, upon normal measuring of an object distance. The light receiver 33 also receives infrared light (remote measuring light) emitted from a remote controller 20 (see (FIG. 2) upon remote measuring of the object distance. The second measuring light receiver 34 receives the remote measuring infrared light emitted from the remote controller 20 only upon remote measuring of the object distance. The releasing light receiver 35 receives releasing infrared light (releasing light) emitted from the remote controller 20 to release an electromagnetic shutter (not shown).

Figure 2:
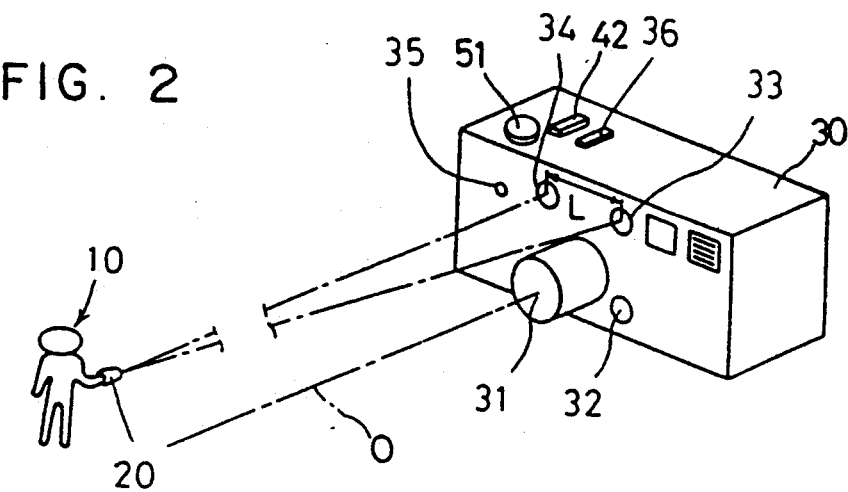
FIG. 2 is a schematic view of the camera shown in FIG. 1, when it is used.

The camera body 30 also has a mode selection switch 36, a measuring mode changing switch 42, and a shutter button 51, as shown in FIG. 2.

The measuring mode changing switch 42 switches the measuring mode between a normal measuring mode, in which the normal measuring light is emitted from the measuring light emitter 32 towards the object to be taken to detect the object distance, and a remote, measuring mode in which the remote measuring light is emitted from the remote controller 20 towards the camera body to detect the object distance.

The mode selection switch 36 is manually actuated by a photographer to select a focal length mode, in which an automatic focusing of the zoom lens 31 is effected, and manual and automatic taking modes in which the focal length of the zoom lens 31 is manually and automatically determined, respectively.

Figure 10:
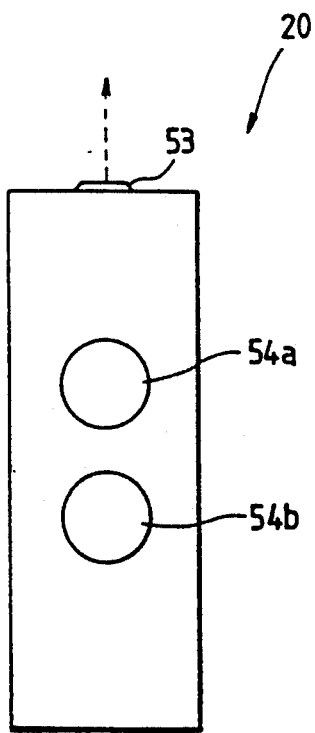
FIG. 10 is a schematic view of a single remote controller according to a first aspect of the present invention.

The remote controller 20, which is carried by the photographer when he or she intends to be the object which is to be taken, has a light emitter 53 that emits the remote releasing light (e.g., infrared light) to actuate the shutter release of the camera body 30 by a remote control and the remote measuring light (e.g., infrared light having a wavelength different than that of the remote releasing light), respectively, as shown in FIG. 10. The remote controller 20 also has operation buttons 54a and 54b which are actuated to emit the remote releasing light and the remote measuring light, respectively.

As can be seen in FIG. 1, the measuring light emitter 32 includes a light emitting lens 32a and a light emitting element 32b which emits the normal measuring light. The first measuring light receiver 33 and the second measuring light receiver 34 have light receiving lenses 33a and 34a, and light receiving elements 33b, 34b made of, for example, a plurality of optical position detecting elements (not shown), such as PSD's (Position Sensitive Devices), which receive the remote measuring light emitted from the remote controller 20, respectively.

As can be seen in FIG. 2, the measuring light emitter 32, the first measuring light receiver 33, and the second measuring light receiver 34 are located so that a line connecting the measuring light emitter 32 and the first measuring light receiver 33 is perpendicular to a line connecting the first measuring light receiver 33 and the second measuring light receiver 34.

The light receiving elements 33b and 34b are made of optical position detecting elements, such as PSD's, and have elongated shapes. The light receiving elements 33b and 34b are arranged horizontally with respect to the camera body when held in a normal horizontal manner. The light receiving element 34b is positioned such that its lengthwise direction is coincident with a line connecting the elements 33b and 34b. The light receiving element 33b is positioned such that its lengthwise direction is inclined at an angle of approximately 45° with respect to both the line connecting the elements 33b and 34b and the line connecting the measuring light emitter 32 and the element 33b, as viewed from the front of the camera body.

In the case where the measuring light emitter 32 and the elements 33b and 34b are provided on the same line, the element 33b is provided such that its lengthwise direction is coincident with the line.

Figure 3:
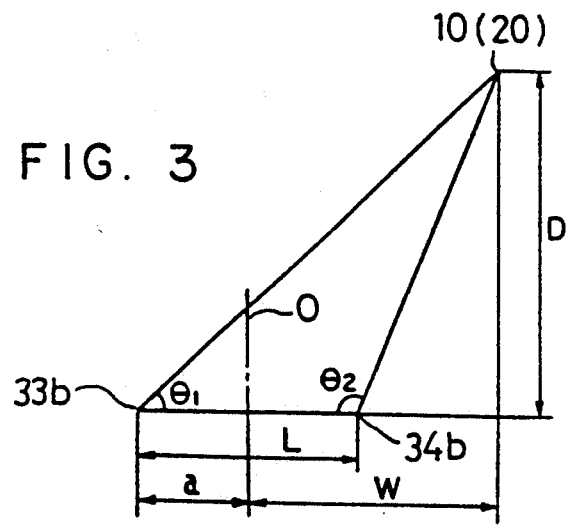
FIG. 3 is a diagram which shows data used in calculating object distance data in accordance with remote measuring light emitted from a remote controller of the camera shown in FIG. 1.

The camera body 30 is provided therein with an angle detecting portion (direction detecting means) 37 and an object distance calculating portion (object distance calculating means) 38 connected to the angle detecting portion 37. The light receiving elements 33b and 34b are connected to the angle detecting portion 37. The angle detecting portion 37 detects the direction of the remote measuring light which is represented by deflection angles $\theta_1$, $\theta_2$ (FIG. 3) of the front wall of the camera body 30 with respect to the optical axis O, in accordance with the position of one of the optical position detecting elements which detects the remote measuring light emitted from the remote controller 20. An output of the angle detecting portion 37, representing the detection data, is inputted to the object distance calculating portion 38.

To solve possible problems caused by that fact that the light receiving range of the light receiving elements 33b and 34b made of PSD's, is narrower than the light receiving range of the releasing light receiver 35, which receives remote release light from the remote controller 20, a 1-second timer starts upon commencement of object distance measurement. Upon completion of the counting operation of the timer, the warning means 59 generates a warning signal to warn an operator that a problem has occurred.

One of the problems may be, for example, that even if the object distance cannot be measured on the camera body side when the remote controller 20 (i.e., the object 10) is positioned out of the light receivable ranges of the light receiving elements 33b and 34b, the releasing operation will be effected if he or she emits the remote releasing light at that position.

The object distance calculating portion 38 calculates the object distance (distance between a photographer, i.e., the object 10 to be taken and the camera body 30), in accordance with the angles $\theta_1$ and $\theta_2$, which are detected by the angle detecting portion 37 as follows:

The object distance D (see FIG. 3) between the remote controller 20 and the light receiving lenses 33b and 34b in the direction of the optical axis O of the zoom lens 31 is calculated as follows:

$$D = (L \tan\theta_1 \cdot \tan\theta_2)/(\tan\theta_1 + \tan\theta_2)$$

wherein "L" designates a distance (base length) between the optical axis of the light receiving lens 33a of the first measuring light receiver 33 and the optical axis of the light receiving lens 34a of the second measuring light receiver 34.

Similarly, distance W between the optical axis O of the zoom lens 31 and an intersecting point of a normal (line) extending from the object 10 to a line perpendicular to the optical axis O and the latter is given by:

$$W = (D/\tan\theta_1) - a$$
$$= L\tan\theta_2/(\tan\theta_1 + \tan\theta_2) - a$$

wherein "a" designates a perpendicular distance between the optical axis O and the light receiving lens 33a of the first measuring light receiver 33.

The object distance calculating portion 38 outputs the distance data thus obtained to the first and second focal length calculating portions 43 and 44 and an AF calculating portion 45.

Figure 4:
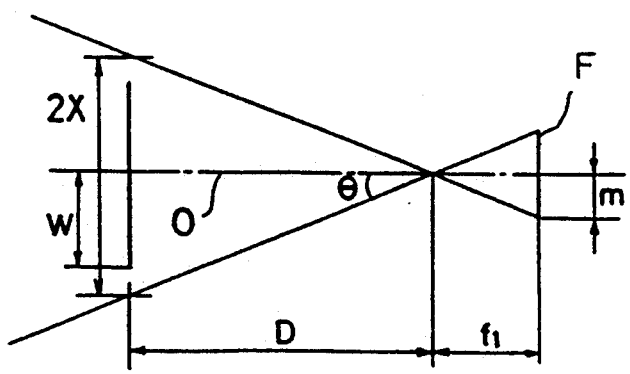
FIG. 4 is a diagram showing how to calculate a focal length by a first focal length calculating means, in the camera shown in FIG. 1.

The first focal length calculating portion 43 calculates an appropriate focal length $f_1$ at which the object 10 is located within the angle $\theta$ of view of the zoom lens 31, in accordance with the distance data from the distance calculating portion 38 (FIG. 4).

Angle $\theta$ of view of the zoom lens 31 is represented by:

$$\tan\theta = m/f_1$$

wherein "$f_1$" designates a focal length of the zoom lens 31, and "m" designates a half-width of the picture plane of the film F, respectively.

Consequently, the following equation is obtained:

$$\tan\theta = W/Dr_1$$
$$\therefore f_1 = mr_1 D/W$$

wherein "$r_1$" designates a value obtained when the distance W is divided by half the total possible photographable length of an object 2X, i.e. X. of the zoom lens 31 in the horizontal direction in case where the camera of the present invention is located in a horizontal position. The value "$r_1$" is a predetermined value, and is 0.9 ($r_1 = 0.9$) in the illustrated embodiment.

By way of example, "m" is 18 (m = 18), so that $f_1 = 16.2$ D/W.

Figure 5:
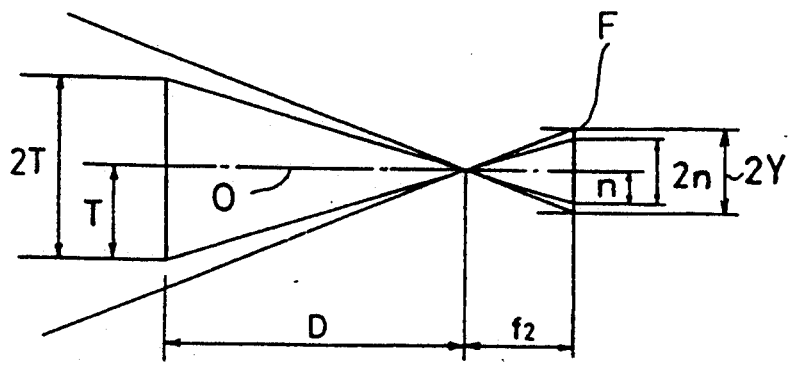
FIG. 5 is a diagram showing how to calculate a focal length by a second focal length calculating means, in the camera shown in FIG. 1.

The second focal length calculating portion 44 calculates an appropriate focal length $f_2$ of the zoom lens 31 at which an image of the object 10 has a predetermined size with respect to the film F, as shown in FIG. 5. In this case, if the height 2T of the object is fixed, for example at 1700 mm, the focal length $f_2$ of the zoom lens 31, at which an image of the object 10 to be formed on the film F has a constant height 2n, is given by the following formula, using the object distance D, the half-height T of the object 10, and the half-height of the image of the object 10 formed on the film F:

$$f_2 = n r_2 D/T \tag{1}$$

wherein "$r_2$" designates a ratio obtained when height 2n is divided by the vertical length of film frame 2Y when the camera is in the horizontal state. The value $r_2$ is a predetermined value and is, for example, 0.9 ($r_2 = 0.9$).

For example, when 35 mm film is used, Y = 12, and accordingly, from formula (1), we have:

$$f_2 = 0.013 \, D \quad \text{(Note: } 2T = 1700\text{)}$$

Thus, the second focal length calculating portion 44 calculates the focal length $f_2$ of the zoom lens 31 at which the object image has a predetermined size with respect to the film F, in accordance with the object distance D from the object distance calculating portion 38, based on the formula $f_2 = 0.013$ D.

Figure 6:
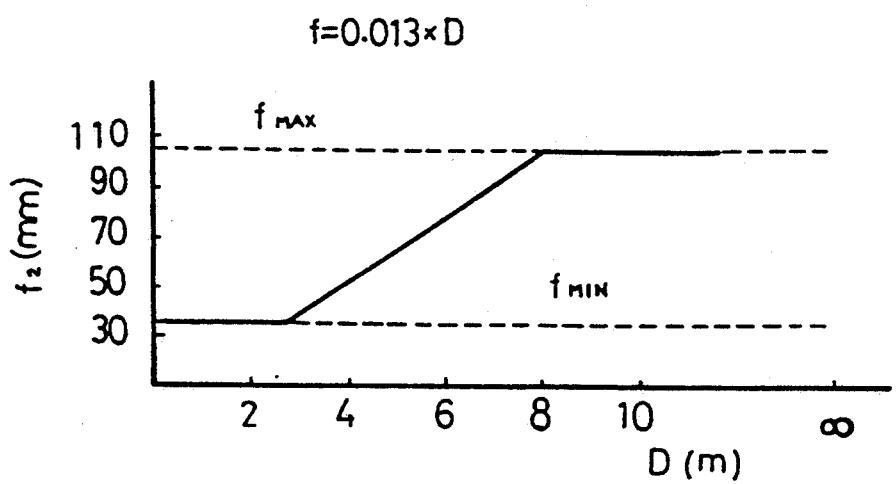
FIG. 6 is a diagram of a relationship between the focal lengths detected by the second focal length detecting means and the object distance.

FIG. 6 shows a relationship between the focal length $f_2$ of the zoom lens and the object distance D.

The AF calculating portion 45 calculates the displacement of the focusing lens 95 in accordance with the distance data D from the object distance calculating portion 38 and outputs the displacement to be inputted to a focusing motor driving circuit 65.

The focal lengths $f_1$ and $f_2$ calculated in the first and second, focal length calculating portions 43 and 44 are supplied to a focal length selecting device 40, which constitutes a focal length selecting means and a mode selecting means 50 which constitutes a focal length mode selecting means and a taking mode selecting means. Element "C" which is shown in FIG. 1, is a central processing unit (CPU).

The focal length selecting device 40 selects one focal length, either $f_1$ or $f_2$, corresponding to the wide angle of view of the zoom lens 31. If the selected focal length $f_1$ or $f_2$ is not within the variable focal length range of the zoom lens 31, a focal length is set to be within the variable focal length range and is supplied to the mode selecting means 50.

Figure 7:
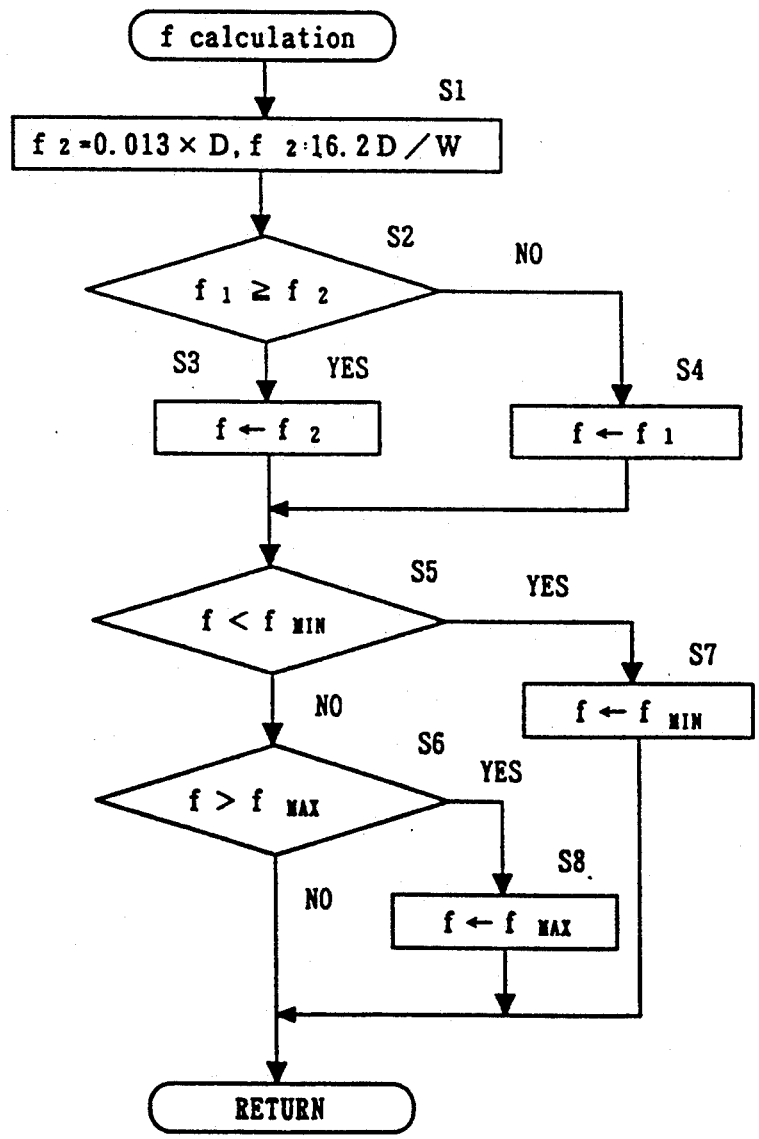
FIG. 7 is a flow chart of a selection operation of the focal lengths of a focal length selecting means in the camera shown in FIG. 1.

The following discussion will be directed to the setting operation of the focal length of the zoom lens 31 by the focal length selecting device 40 and the operations related thereto, with reference to FIG. 7.

In the first and second focal length calculating portions 43 and 44, the two kinds of focal lengths $f_1$ and $f_2$ of the zoom lens 31 are calculated in accordance with the distance data of the object distance calculating portion 38 (step S1).

Thereafter, it is determined whether focal length $f_1$ is larger than focal length $f_2$ at step S2. If focal length $f_1$ is equal to or larger than focal length $f_2$, control proceeds to step S3 at which point focal length $f_2$ is selected as a focal length f, which gives the wide angle of view of the zoom lens 31. Conversely, if focal length $f_1$ is smaller than focal length $f_2$, control proceeds to step S4, at which point focal length $f_1$ is selected as a focal length, which gives the wide angle of view of the zoom lens 31.

Thereafter, control proceeds to step S5, where the focal length selecting device 40 checks whether the selected focal length f is shorter than the shortest focal length $f_{MIN}$ of the zoom lens 31. If the focal length f is longer than the shortest focal length $f_{MIN}$, it is determined whether the focal length f is longer than the longest focal length $f_{MAX}$ at step S6. If the focal length f is shorter than the shortest focal length $f_{MIN}$, the shortest focal length $f_{MIN}$ is selected as the focal length f, and control is returned (step S7). If the focal length f is longer than the longest focal length $f_{MAX}$ at step S6, the longest focal length $f_{MAX}$ is selected as the focal length f, and control is returned (step S8). If the focal length f is shorter than the longest focal length $f_{MAX}$, control is directly returned. The focal length is thus calculated in the focal length selecting means 40.

The focal lengths $f_1$ and $f_2$ obtained by the first and second focal length calculating portions 43 and 44, and the focal length selected by the focal length selecting means 40 are inputted to the mode selecting device 50, which is connected to the mode selecting switch 36.

When the photographing mode selecting switch 36 is actuated, the mode selecting device 50 selects the first mode in which the focal length of the zoom lens 31 is identical to the focal length $f_1$ calculated by the first focal length calculating portion 43, the second mode in which the focal length of the zoom lens 31 is identical to the focal length $f_2$ calculated by the second focal length calculating portion 44, and the third mode in which the focal length of the zoom lens 31 is identical to the focal length selected by the focal length selecting device 40.

The mode selecting device 50 also selects the manual mode in which the zoom lens 31 can be manually moved in the direction of the optical axis O when the operator actuates the mode changing switch 36, in addition to the selection of the focal length modes. When the mode selecting device 50 selects one of the focal length modes mentioned above, the data representing the focal length of the zoom lens 31 corresponding to the selected focal length mode is supplied to the zoom motor driving circuit 60, which constitutes a zoom lens driving means. Conversely, when the mode selecting device 50 selects the manual photographic mode in which the zoom lens 31 is manually moved in the optical axis direction, data representing the focal length is not output from the mode selecting device 50 to the motor driving circuit 60.

Namely, the mode selecting device 50 serves as a photographic mode selecting means for selecting the mode in which the zoom lens 31 is moved in the optical axis direction by the motor driving circuit 60, or the mode in which the zoom lens 31 is manually moved in the optical axis direction, and further serves as a focal length selecting means for selecting one of the above-mentioned three focal length modes.

The motor driving circuit 60 drives the zoom motor 70, which constitutes a zoom lens driving means, together with the motor driving circuit 60 to move the zoom lens 31 in the optical axis direction, in accordance with the focal length data of the zoom lens 31 corresponding to the set focal length mode.

The focusing motor driving circuit 65 drives the focusing motor 75 in accordance with the amount of defocus calculated by the AF calculating portion 45 to move the focusing lens 95 in the optical axis direction thereof. Numeral 80 designates an AE photometering portion of the automatic exposure mechanism (not shown), and 90 designates an encoder for detecting the driving state of the zoom lens 31. The AE photometering portion 80 is connected to the central processing unit C having the object distance calculating portion 38, the first focal length calculating portion 43, the second focal length calculating portion 44, the focal length selecting device 40, and the mode selecting device 50. The encoder 90 is connected to the motor driving circuit 60 to feed-back the latest focal length data of the zoom lens 31.

Figure 8:
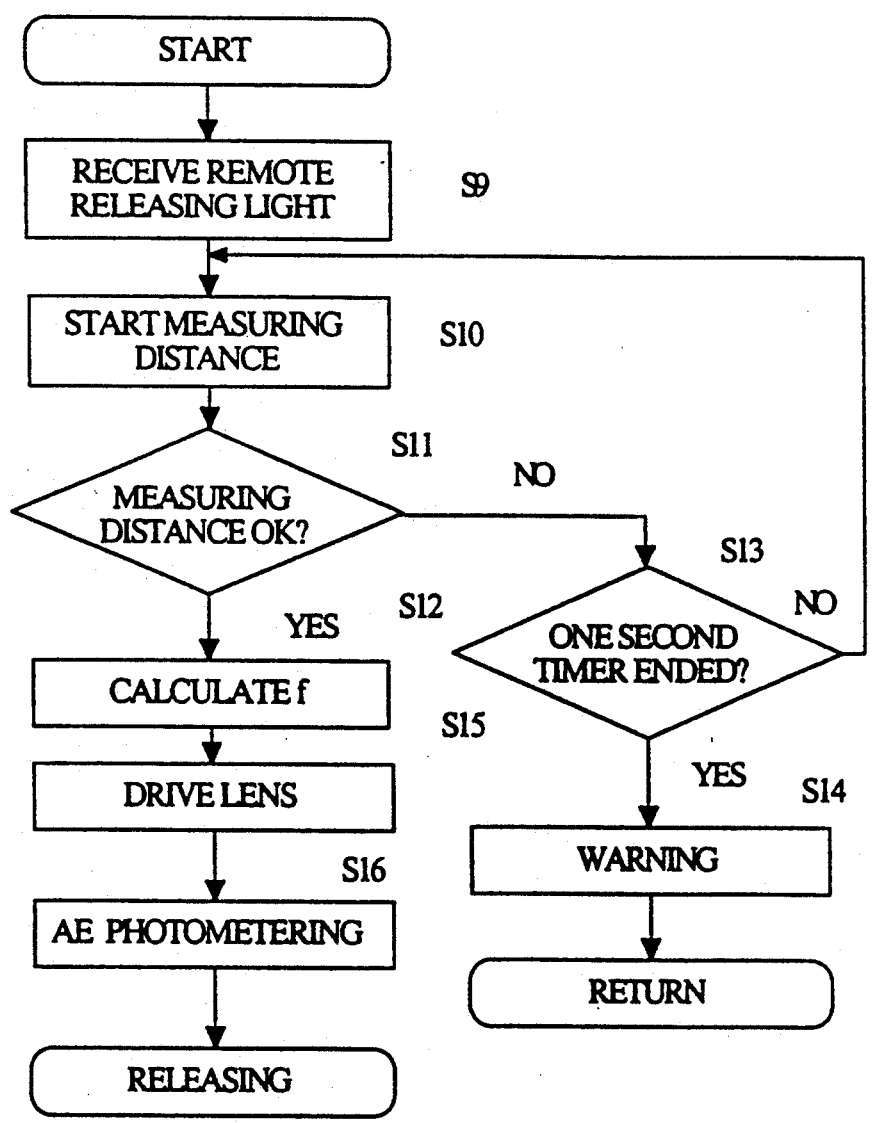
FIG. 8 is a flow chart of operations from the receipt of the infrared measuring light to a shutter release in a camera body of the camera shown in FIG. 1.

The automatic drive of the zoom lens 31 of the camera as constructed above is effected in accordance with the distance data (FIG. 8), as follows:

Before a picture is taken, the measuring mode changing switch 42 is actuated to select the remote measuring mode. The object 10 to be taken, i.e., the operator carries the remote controller 20 and, while viewing the finder through an ocular window, moves to a desired position.

In this position, the operator points the remote controller 20 towards the camera and presses the operation button 54a. As a result, the releasing light is emitted from the remote controller 20 and is then received by the releasing light receiver 35 of the camera body (step S9). Thereafter, the remote measuring light which is emitted from the remote controller 20 by actuating the operation switch 54b is received by the first and second measuring light receivers 33 and 34.

Consequently, the angle detecting portion 37 and the distance calculating portion 38 calculate the distance data in accordance with the position of the receipt of the remote measuring light by the light receiving elements 33b and 34b of the first and second measuring light receivers 33 and 34 (step S10). The distance data thus obtained is supplied to the first and second focal length calculating portions 43 and 44.

At step S11, whether the calculation of the object distance is appropriately effected by the distance calculating portion 38 is checked. If the calculation of the object distance is appropriately effected, control proceeds to step S12. Conversely, if the calculation of the object distance is not appropriately effected, i.e. if distance data is not available, the warning signal is issued by the warning means 59 when the time set by the 1-second timer, which started upon commencement of the measurement of the object distance, is up (steps S13 and S14).

At step S12, the focal length f which was discussed with reference to FIG. 7 is calculated in the first focal length calculating means 43, the second focal length calculating means 44, and the focal length selecting means 40, in accordance with the object distance data from the distance calculating means 38.

When the calculation of the focal length f is completed at step S12, data representing, the set focal length of the zoom lens 31 is supplied to the motor driving circuit 60 through the focal length selecting means 40 and the mode selecting device 50. Furthermore, the current focal length of the zoom lens 31 is monitored by the encoder 90 and is compared with the focal length selected by the mode selecting device 50 to drive the zoom lens 31 in the optical axis O direction through the motor driving circuit 60 or the zoom motor 70 (step S15).

Thereafter, the AE photometering portion 80 detects the brightness (step S16) to permit the releasing operation. Consequently, the electromagnetic shutter (i.e., the sectors thereof) open at a predetermined aperture for a predetermined time during the releasing operation in accordance with the detection of the AE photometering portion 80. A series of operations is thus completed.

As mentioned above, in the illustrated embodiment, the focusing operation of the focusing lens 95 is performed by the focusing motor 75 before the zoom motor 70 drives the zoom lens 31 in the optical axis direction 0. During the focusing operation, the operation of the focusing motor 75 is effected by the focusing motor driving circuit 65 as a result of the displacement calculated by the AE calculating portion 45, so that the focusing lens 95, which is initially located at the infinite position, is moved in the optical axis direction thereof. Accordingly, even if the object 10 to be taken is not located at the center of the field of view of the zoom lens 31, the distance of the object can be detected regardless of the position thereof within the field of view of the zoom lens 31.

On the other hand, if the object distance is detected by the normal measuring light emitted from the measuring light emitter 32 of the camera body 30, the mode selecting switch 36 is actuated to select the normal measuring mode. The remote controller 20, held by the photographer 10, is then actuated to emit remote releasing light. In response thereto, the measuring light emitter 32 of the camera body 30 emits the normal measuring light toward the object 10.

Figure 9:
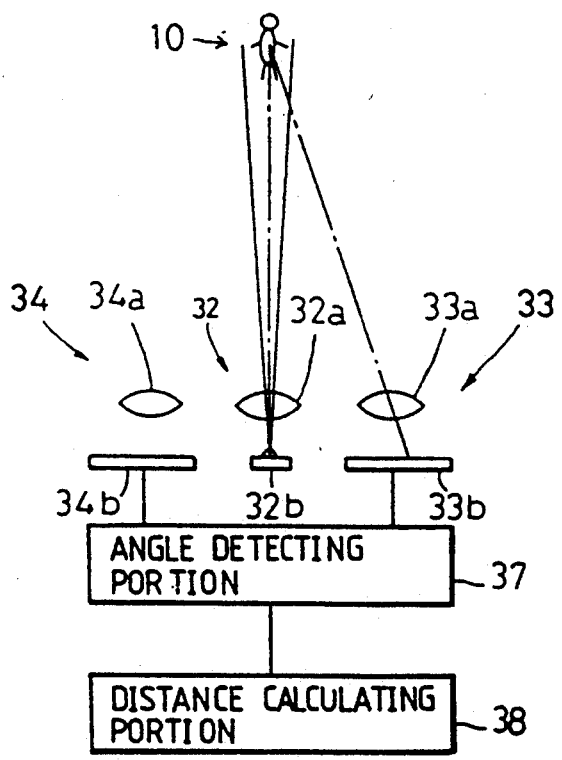
FIG. 9 is a schematic view of internal constituent elements of a camera which receive measuring infrared light in the camera shown in FIG. 1.

The normal measuring light emitted from the measuring light emitter 32 is made incident upon the object 10 and is reflected thereby to be received by the first measuring light receiver 33, as shown in FIG. 9. The angle detecting portion 37 detects the angle of deflection of the front wall of the camera body with respect to the optical axis O, in accordance with the position of the receipt of the normal measuring light by the first measuring light receiver 33 and the distance (base length) L between the first measuring light receiver 33 and the measuring light emitter 32. Furthermore, the angle detecting portion 37 detects the distance data in accordance with the angle of deflection and outputs the data (numerical values) to the distance calculating portion 38. As a result, the distance calculating portion 38 calculates the distance of the object 10 from the camera body 30 in accordance with the data input thereto.

As can be seen from the above discussion, in a camera having an object distance measuring device according to the present invention, since the object distance is detected by light emitted from the side of the object 10, the focal length of the zoom lens 31 can be precisely adjusted in accordance with the detected object distance. Consequently, if the photographer is the object to be taken, the object is precisely in-focus and the framing, in which the object 10 is within the photographable range of the camera or the image of the object 10 has a predetermined size relative to the film, can be automatically effected. It is also possible to automatically effect framing in which the focal length of the zoom lens 31 is on the wide angle side.

Furthermore, it is possible to automatically select the framing modes mentioned above. In addition, the mode in which the focal length of the zoom lens 31 is automatically adjusted and the mode in which the photographer manually adjusts the focal length of the zoom lens 31 can be selected.

It is also possible to effect the whole for movement of the zoom lens 31 in the optical axis direction by the zoom motor driving circuit 60.

Furthermore, it is possible to move the zoom lens 31 in the optical axis direction in accordance with the focal length $f_1$ only calculated by the first focal length calculating portion 43. It is possible to move the zoom lens 31 in the optical axis direction in accordance with the focal length $f_2$ only, calculated by the second focal length calculating portion 44. It is possible to move the zoom lens 31 in the optical axis direction in accordance with the focal length only, selected by the focal length selecting means 40.

Although there are two measuring light receivers provided in the camera body 30 to receive the remote measuring light emitted from the remote controller 20 in the illustrated embodiment, it is possible to provide three or more measuring light receivers in the camera body.

Furthermore, although the remote measuring light is separate from the remote releasing light in the illustrated embodiment, it is possible to use the same light for both the remote releasing light and the remote measuring light.

The following discussion will be directed to a second embodiment of the present invention.

In the first embodiment mentioned above, upon releasing, at least the object holding the remote controller 20 is accommodated to be within the angle of view of the taking lens (zoom lens) 31. However, another object on the opposite side of the first object holding the remote controller 20 with respect to the optical axis O of the zoom lens 31 can be accommodated only when the second object is at a position symmetrical to the position of the first object with respect to the optical axis O or closer to the optical axis than the first object. Namely, if the second object is not within the symmetrical arrangement of the first object with respect to the optical axis, the second object may be outside of the angle of view of the taking lens 31.

For instance, upon taking a picture of collective objects, if an operator (first object) of a remote controller is in the vicinity of the center of the picture plane, those who are further out than the operator may not be within the angle of view of the taking lens. To solve this problem, two remote controllers are employed to position two desired points within the angle of view of the taking lens, in the second embodiment. The components of the second embodiment corresponding to those of the first embodiment are designated with the same reference numerals as those of the first embodiment.

Figure 12:
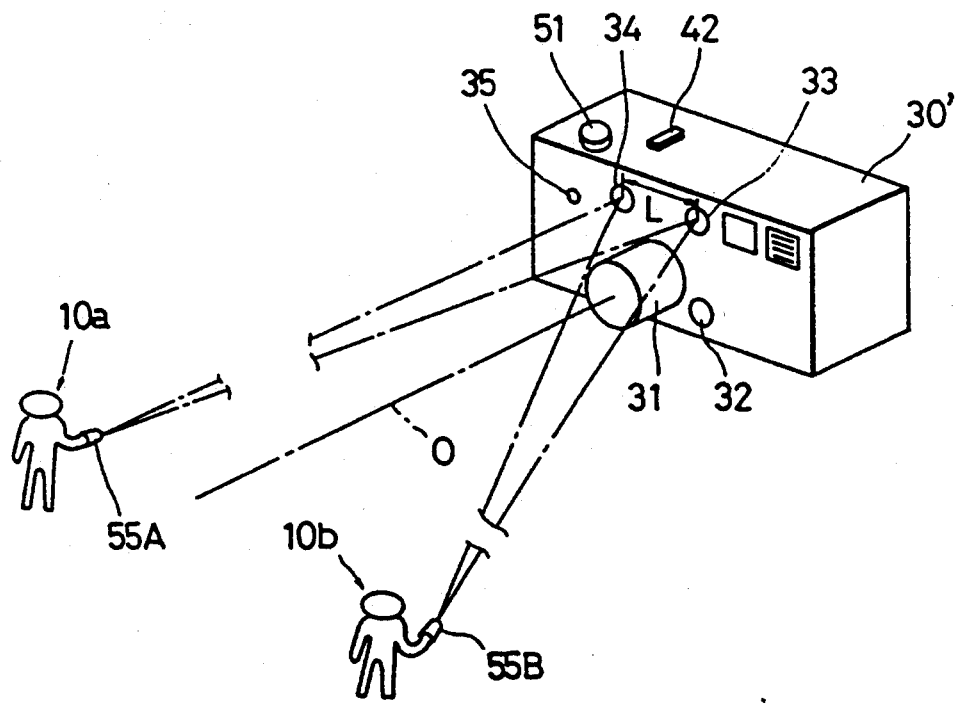
FIG. 12 is a schematic view of the operation of the camera shown in FIG. 11.

In the second embodiment shown in FIG. 12, camera body 30' has no mode selection switch 36 as is provided in camera body 30 of the first embodiment, and the light receiving elements 33b and 34b, which are made of light incident position detecting elements, such as PSD's in the first embodiment, are herein made of CCD's.

Furthermore, in the camera body 30' of the second embodiment, the object distance measuring light emitter 32, which emits infrared light for the regular measurement of the object distance in the first embodiment, emits emission inducing light upon receipt of the remote release light from the remote controller 55A. The emission of remote object distance measuring light by the remote controllers 55A and 55B is induced upon receipt of the emission inducing light. The object distance measuring light emitter 32 also emits emission ceasing light for ceasing the emission of the remote measuring light from the remote controllers 55A and 55B.

Figure 13:
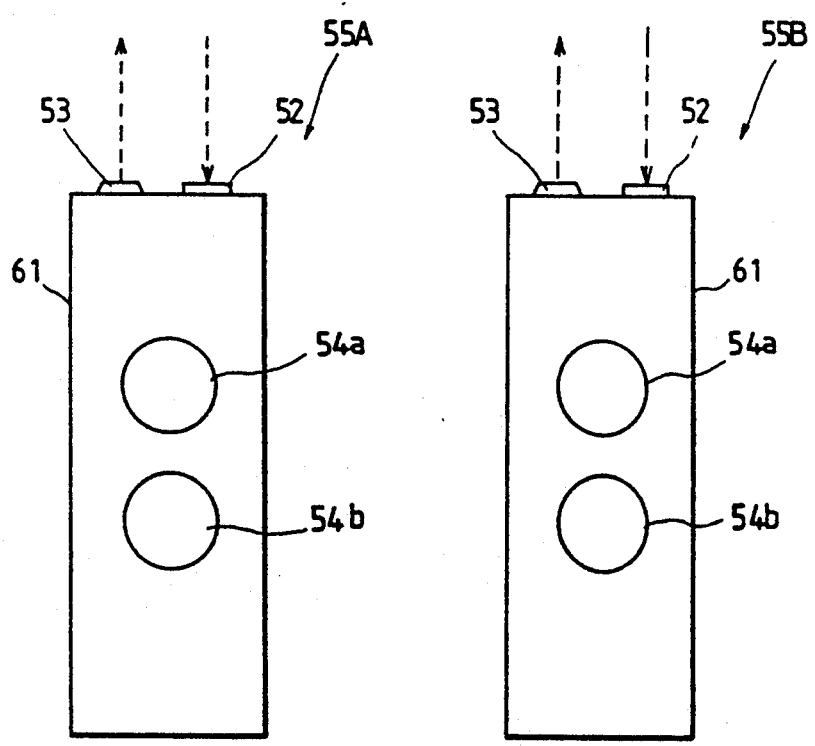
FIG. 13 is a schematic view of remote controllers common to the second embodiment through a fifth embodiment of the present invention.

FIG. 13 shows the remote controllers 55A and 55B of the second embodiment.

The remote controllers 55A and 55B have a light receiving function in addition to the light emitting function, unlike the remote controller 20 in the first embodiment in which it has no light receiving function.

Figure 14:
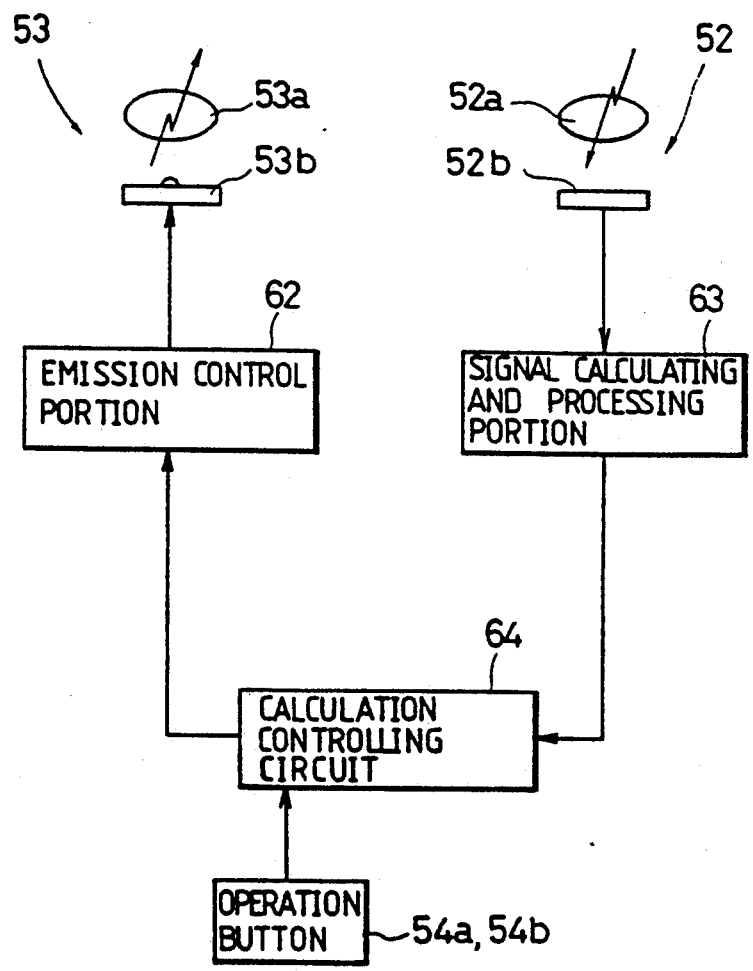
FIG. 14 is a block diagram of one remote controller shown in FIG. 13.

In FIGS. 13 and 14, each body 61 of remote controllers 55A and 55B is provided on the front end thereof with a light emitter 53 and a light receiver 52. The light emitter 53 has a light emitting lens 53a and a light emitting element 53b. The light emitting element 53b emits remote releasing light, such as infrared light, to commence the necessary calculation by the control system of the camera body 30' and to control the releasing operation. The light emitting element 53b also emits remote measuring light, such as infrared light, having a wavelength that is different from that of the remote releasing light. The remote measuring light is intermittently emitted at a predetermined time interval in accordance with the control of the light emission controller 62.

The light receiver 52 has a light receiving lens 52a and a light receiving element 52b which receives the emission inducing light and the emission ceasing light emitted from the measuring light emitter 32 of the camera body 30'. Each remote controller body 61 has an operation button 54a which is actuated to control the emission of the remote releasing light and an operation button 54b which is actuated to control the emission of the remote measuring light.

Each of the remote controllers 55A and 55B has an emission control portion 62 for controlling the emission of the remote releasing light by the light emitting element 53b and a signal processing portion 63 for performing the necessary calculation in accordance with the emission inducing light and the emission ceasing light received by the light receiving element 52b. The emission control portion 62 controls the emission so that the remote releasing light is emitted when the operation button 54a is depressed. The remote measuring light is intermittently emitted at a predetermined interval when the operation button 54b is depressed.

Each of the remote controllers 55A and 55B includes a calculation control circuit 64 to control the emission control portion 62 in accordance with the output of the signal processing portion 63. The operation buttons 54a and 54b are connected to the calculation control circuit 64, which outputs not only the emission command signal of the remote releasing light or the remote measuring light to the emission control portion 62 in accordance with the operation of the operation buttons 54a and 54b, but also the emission stop command signal to the emission control portion 62 in accordance with the emission ceasing signal of the remote measuring light from the signal processing portion 63.

Figure 11:
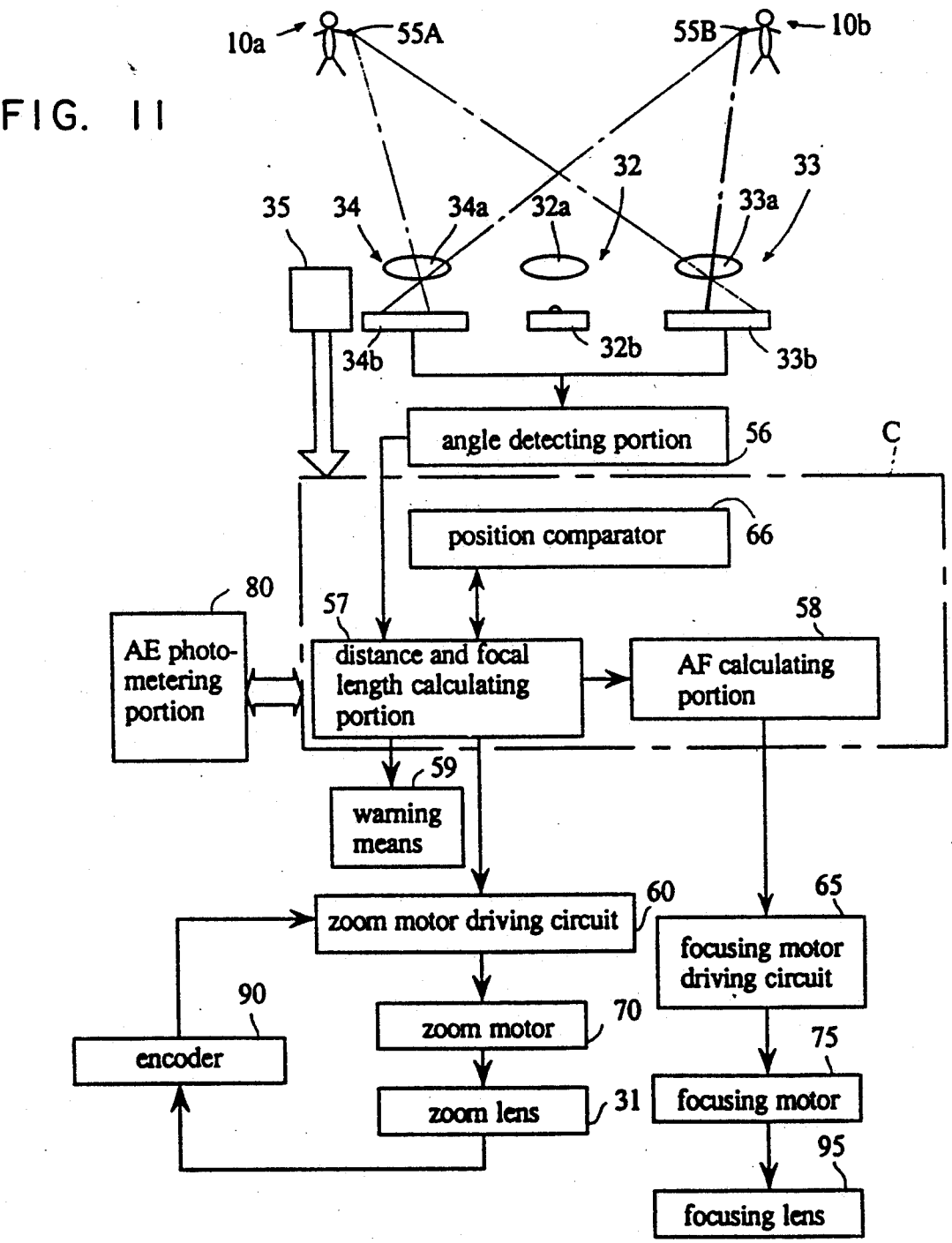
FIG. 11 is a block diagram of a camera having an object distance measuring device according to a second embodiment of the present invention.

In the control system of the second embodiment, as can be seen in FIG. 11, the light receiving elements 33b and 34b are connected to the input terminals of an angle detecting portion 56 which is connected to a distance and focal length calculating portion 57. The angle detecting portion 56 detects the direction of the remote measuring light as a deflection angle of the front wall of the camera body 30 with respect to the optical axis of the remote measuring light, in accordance, not limited to, with the location of the received remote measuring light emitted from the remote controller 55A or 55B on the surface of the light detecting element. The detection data is then output to the distance and focal length calculating portion 57.

The distance and focal length calculating portion 57 calculates the distance between the camera body and the remote controllers 55A and 55B, i.e., the distance between the camera body 30' and the objects (i.e., operators) 10a and 10b, in accordance with angles $\theta_1$, $\theta_2$, $\phi_1$, and $\phi_2$ (i.e., detection data) of the angle detecting portion 56, similar to the calculation by the distance calculating portion 38 in the first embodiment. The calculated data is then supplied to the AF calculating portion 58, the zoom motor drive circuit 60 and the warning means 59.

The distance and focal length calculating portion 57 also calculates a focal length which is needed for photographing both the object carrying the remote controller 55A and the object carrying the remote controller 55B in the same photographing frame. Furthermore, the distance and focal length calculating portion 57 also calculates F NO.

A position comparator 66 is connected to the distance and focal length calculating portion 57 to compare the position data of the remote controllers 55A and 55B, calculated by the distance and focal length calculating portion 57, with reference data regarding the photographable angle of view of the zoom lens 31 preinputted therein, to determine whether the remote controllers 55A and 55B are within the photographable range. The result of the judgement is supplied to the distance and focal length calculating portion 57.

When an object distance measurement can not be effected, i.e., if the position comparator 66 determines that the object carrying the associated remote controller is not within the photographable angle of view, the warning means 59 generates a warning signal, thereby alerting the photographer.

The AF calculating portion 58 calculates the necessary displacement of the focusing lens 95 in accordance with object distances G and H (see FIG. 15) from the distance and focal length calculating portion 57 and supplies the calculated data to the focusing motor driving circuit 65. The zooming motor drive circuit 60, the zooming motor 70, the zoom lens 31, the encoder 90, the focusing motor driving circuit 65, the focusing motor 75, and the focusing lens 95 are driven and controlled in the same manner as that of the first embodiment.

The operation of the second embodiment will be described below with reference to FIGS. 16 through 21.

Upon taking a picture of a plurality of objects which are aligned in a row, the distance measuring mode selecting switch 42 is actuated to select the remote object distance measuring mode, so that the camera body 30' is in a position to receive the remote releasing light from the remote controller 55A. In this position, when the object 10a (FIGS. 11, 15), holding the remote controller 55A located at the end of the row, directs the remote controller 55A to the camera body 30' and actuates the operation button 54a, the remote releasing light is emitted from the light emitting element 53b to commence the calculation on the camera body side in accordance with the control of the emission control portion 62 which receives the emission command signal from the calculation control circuit 64.

As a result, when the remote releasing light is received by the releasing light receiver 35, the emission inducing light is emitted from the distance measuring light emitter 32 of the camera body 30'. When the emission inducing light is received by the light receiving elements 52b of the remote controllers 55A and 55B, the light emitting elements 53b emit the remote distance measuring light in accordance with the control of the respective light emission controllers 62, even if the operation button 54b is not actuated (steps S20 and S21). It should be noted that since the objects 10a and 10b located at the opposite ends of the row direct their remote controllers 55A and 55B to the camera body, the rays of remote measuring light emitted by the remote controllers 55A and 55B are substantially simultaneously received by the light receiving elements 33b and 34b of the first and second measuring light receiving portions 33 and 34, respectively.

In order to prevent the light receiving elements 33b and 34b from having detecting errors, the detecting output signals of both the light receiving elements 33b and 34b, which are outputted to the CPU C, are made invalid while the distance measuring light emitter 32 is ON.

The angle detecting portion 56 detects the directions of the remote controllers 55A and 55B as the deflection angles $\theta_1$, $\theta_2$ and $\phi_1$, $\phi_2$ of the front wall of the camera body 30' with respect to the optical axes of the rays of remote measuring light from the remote controllers 55A and 55B, respectively. Before the values for the deflection angles $\theta_1$, $\theta_2$, and $\phi_1$, $\phi_2$ are identified as the correct values corresponding to the remote controllers 55A and 55B, respectively, the detected deflection angle values for the remote controllers 55A and 55B are temporarily set as four angle values $A_1$, $A_2$, $B_1$, and $B_2$ for the purpose of differentiating between the deflection angle values for the remote controllers 55A and 55B. The correspondence of the angles $A_1$, $A_2$, $B_1$, and $B_2$ to the deflection angle values for the remote controllers 55A and 55B are identified as follows (FIG. 19):

If angles $A_1$ and $A_2$ are detected in accordance with the detection data of the light receiving element 33b, the two angles $A_1$ and $A_2$ are compared with each other. As a result, if angle $A_1$ is larger than angle $A_2$ (i.e., $A_1 > A_2$), $\theta_1 = A_2$, and $\phi_1 = A_1$. Thus, the values of $A_2$ and $A_1$, detected by the light receiving element 33b, are assigned to $\theta_1$ and $\phi_1$, respectively, thereby assigning the correct deflection angle values to the remote controllers 55A and 55B.

Conversely, if angle $A_2$ is larger than angle $A_1$ ($A_1 < A_2$), $\theta_1 = A_1$, and $\phi_1 = A_2$. Thus, the values of $A_1$ and $A_2$ are assigned to $\theta_1$ and $\phi_1$, respectively (steps S22, S23, S42~S46).

Similarly, if angles $B_1$ and $B_2$ are detected in accordance with the detection data of the light receiving element 34b, the two angles $B_1$ and $B_2$ are compared with each other. As a result, if angle $B_1$ is larger than angle $B_2$ ($B_1 > B_2$), $\theta_2 = B_1$, and $\phi_2 = B_2$. Thus, the values of $B_1$ and $B_2$, detected by the light receiving element 34b, are assigned to $\theta_2$ and $\phi_2$, respectively.

Conversely, if angle $B_2$ is larger than angle $B_2$ ($B_1 < B_2$), $\theta_2 = B_2$, and $\phi_2 = B_1$. Thus, the values of $B_2$ and $B_1$ are assigned to $\theta_2$ and $\phi_2$, respectively (steps S23, S47~S51).

Thereafter, the four data values thus obtained are supplied to the distance and focal length calculating portion 57.

Figure 19:
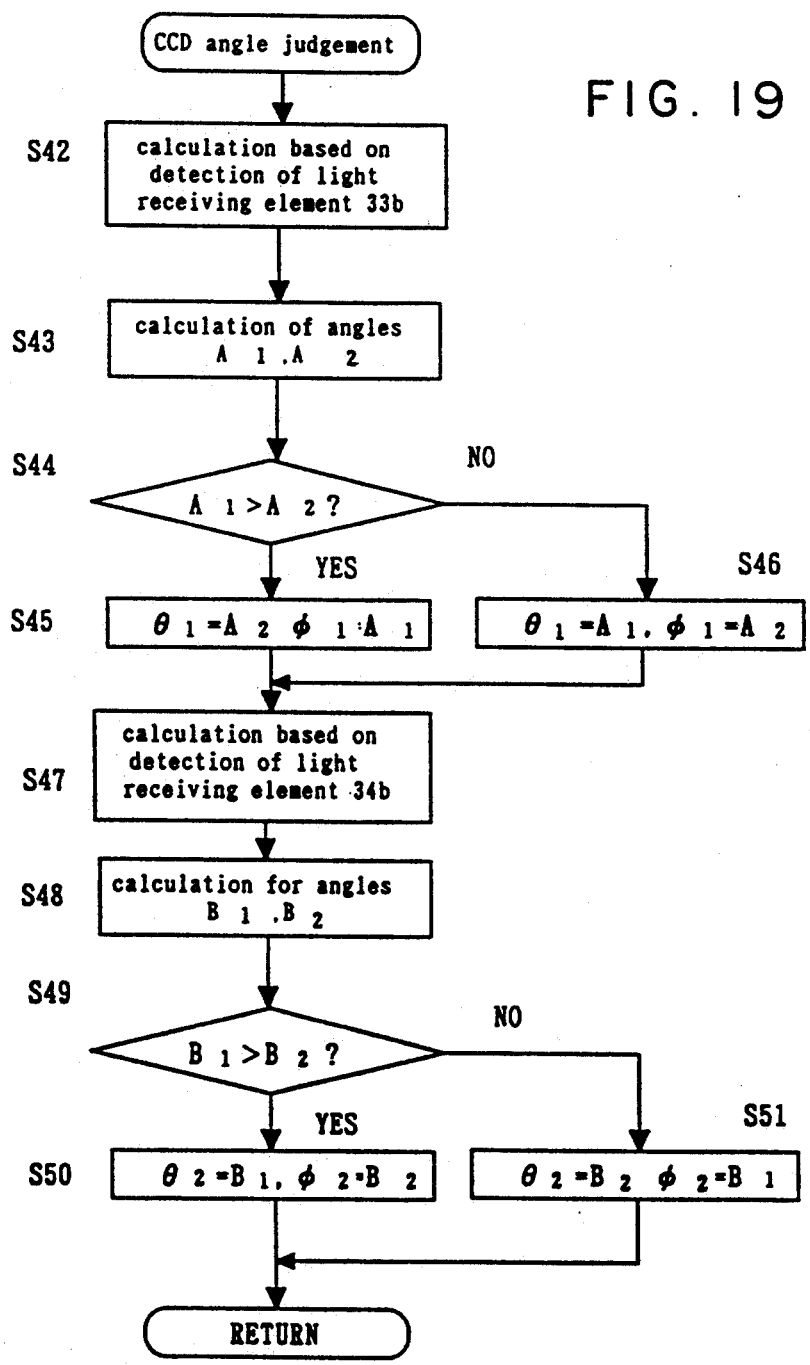
FIG. 19 is a flow chart of a judging operation of a direction detected by a light receiver made of CCD sensors, in the second embodiment of the present invention.

In the illustrated embodiment, since the light receiving elements 33b and 34b are made of CCD's, as mentioned above, the four intersection points 55A, 55B, M and N (FIG. 15) can be detected by a combination of the four detected angles when the rays of remote measuring light are substantially simultaneously emitted by the remote controllers 55A and 55B. Alternatively, if an angle judgement, as shown in FIG. 19, is not effected, it is possible to obtain the necessary distance data using only two of the four intersection points. In this alternative, after the four intersection points are calculated, two of them, i.e., points 55A and 55B, are selected as practical and usable points, and the intersection point M of the bundles of rays b and g and the intersection point (negative value) N of the bundles of rays c and e are excluded. Since the intersection point represented by a negative value is not practical and therefore can not be used, the intersection point N to be excluded can be easily found by detecting the sign (positive or negative) of the value. Furthermore, since the intersection point M of the bundles of rays b and g is always located closer to the camera body than the intersection points (remote controllers) 55A and 55B, regardless of a forward or backward movement of the latter, the intersection point M to be excluded can be easily found by comparing the distance of the intersection points 55A, 55B and M from a plane I in which the light receiving elements 33b and 34b lie. Namely, the distance (positive value) of the intersection point M from the plane I is always smaller than those of the intersection points 55A and 55B.

Figure 15:
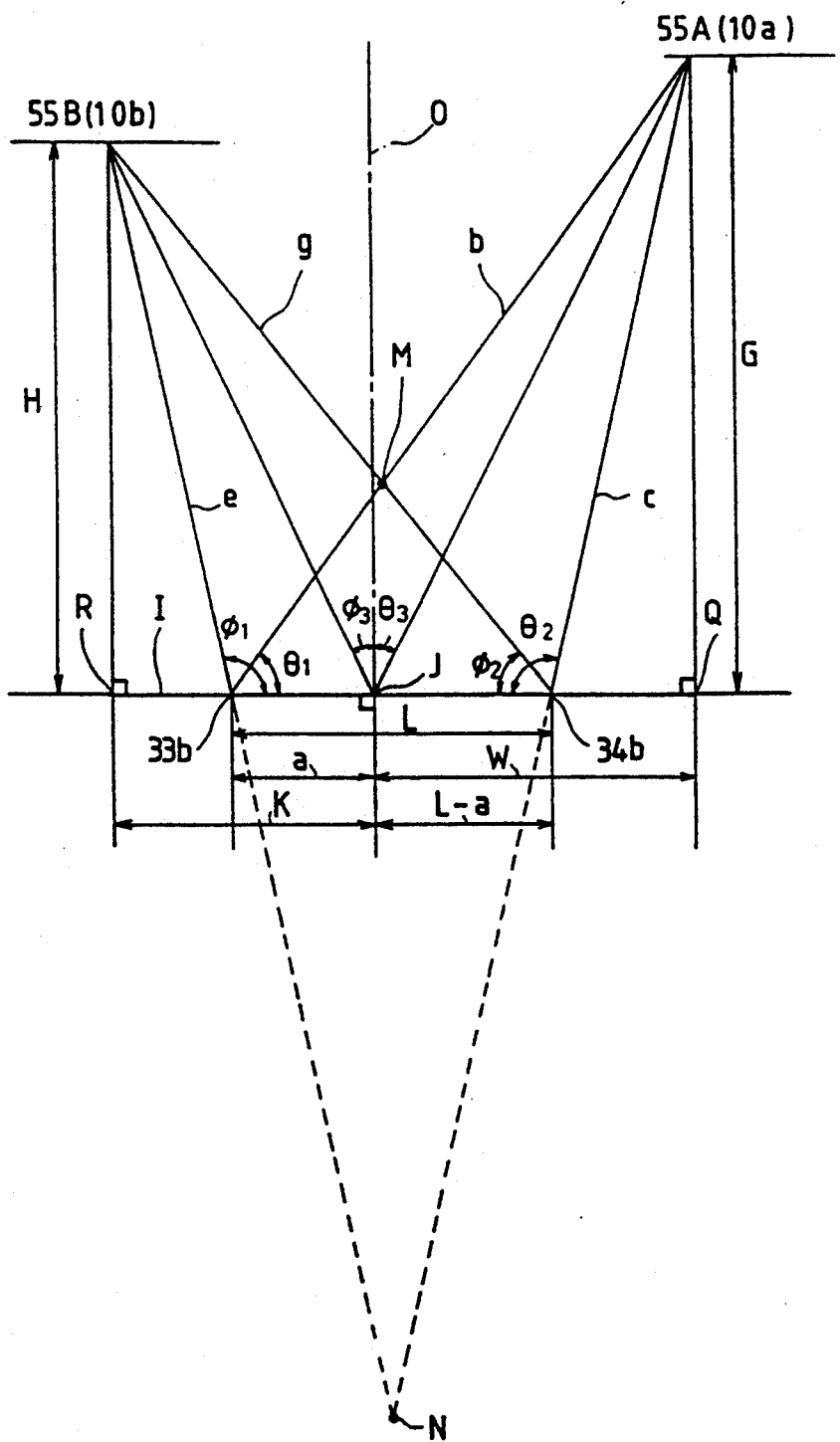
FIG. 15 is a diagram for explaining how to calculate object distance data by a distance calculating means in accordance with remote measuring light emitted from a remote controller of the second through fifth embodiments.
Figure 16:
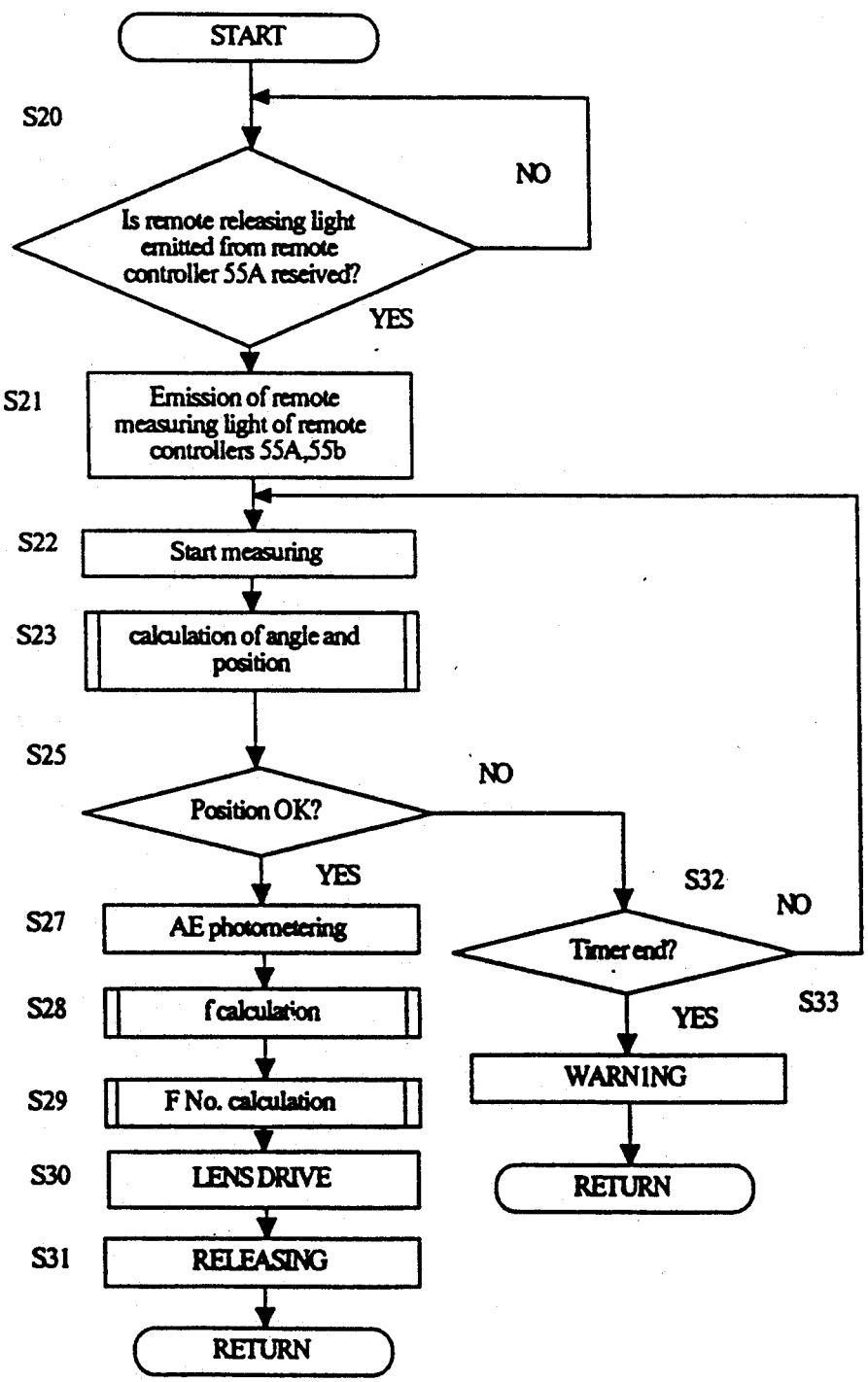
FIG. 16 is a flow chart of operations of a camera body according to a second embodiment of the present invention.
Figure 17:
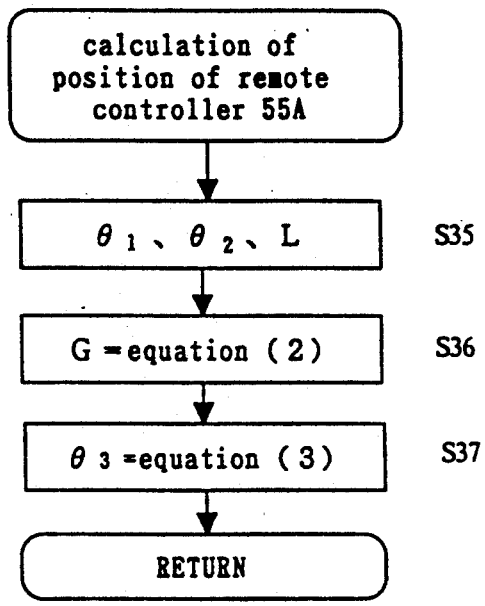
FIG. 17 is a flow chart of a position calculation with respect to one of the remote controllers in the second embodiment of the present invention.
Figure 18:
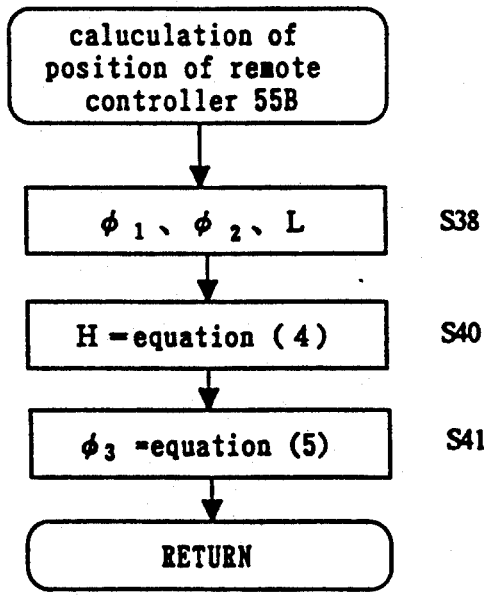
FIG. 18 is a flow chart of a position calculation with respect to the other remote controller in the second embodiment of the present invention.

In summary, there are two manners in which distance data (i.e., points 55A and 55B) are determined. In both cases, four angles ($\theta_1$, $\theta_2$, $\phi_1$, and $\phi_2$), which are shown in FIG. 15, are detected. In the illustrated embodiment, these angles are compared (see FIG. 19) to determine the location of points 55A and 55B. In the alternative, the comparison operation of the flow chart in FIG. 19 is not used. Rather, the four above-mentioned angles are used to determine four points corresponding to points 55A, 55B, M, and N, as shown in FIG. 15. However, which of these four points corresponds to the two remote control devices is not known. Therefore, by eliminating points M and N, the location of points 55A and 55B can be determined.

The distance and focal length calculating portion 57 performs the following calculation in accordance with the direction data inputted thereto from the angle detecting portion 56 (FIG. 17):

The calculation to detect the position of the remote controller 55A is first performed (steps S23, S35~S37). The Object distance G of the remote controller 55A (object 10a) is obtained by the following equation:

$$G = L \tan \theta_1 \tan \theta_2 / (\tan \theta_1 + \tan \theta_2) \quad (2)$$

wherein L is a distance (base length) between the light receiving elements 33b and 34b (i.e., the optical axes of the light receiving lenses 33a and 34a) on line (plane) I perpendicular to optical axis O (FIG. 15).

Next, distance W, between intersection point Q of the line extending from the point 55A and normal to the plane (line) I and intersection point J of plane I and optical axis O, is obtained by:

$$W = L \tan \theta_2 / (\tan \theta_1 + \tan \theta_2) + a$$

The angle $\theta_3$ defined by the line connecting intersection point J of the optical axis O with line I and the remote controller 55A, and optical axis O is given by:

$$\theta_3 = 90° - \tan^{-1}\{L \tan \theta_1 \tan \theta_2 / [a \tan \theta_1 + (L-a)\tan \theta_2]\} \quad (3)$$

wherein "a" designates a distance between the optical axis of the light receiving lens 33a of the first light receiving portion 33 and the optical axis O.

The distance and focal length calculating portion 57 receives the direction data from the angle detecting portion 56 and calculates the position of the remote controller 55B (object 10b), (similar to the remote controller 55A mentioned above (steps S23, S38~S41 in FIG. 18). Namely, object distance H of the remote controller 55B (object 10b) is obtained by the following equation:

$$H = L \tan \phi_1 \tan \phi_2 / (\tan \phi_1 + \tan \phi_2) \quad (4)$$

Next, distance K between the intersection point R of the line extending from the point 55B and normal to plane (line) I and plane I and optical axis O is obtained by:

$$K = L \tan \phi_2 / (\tan \phi_1 + \tan \phi_2) + a$$

The angle $\phi_3$ defined by the line connecting intersection point J and the remote controller 55B, and optical axis O is given by:

$$\phi_3 = 90° - \tan^{-1}\{L \tan\phi_1 \tan \phi_2 / [(a-L)\tan \phi_1 + a \tan \phi_2]\} \quad (5)$$

The position data (distance data) of the remote controllers thus calculated by the distance and focal length calculating portion 57 is supplied to the position comparator 66.

Consequently, the input position data is compared with the reference data of angle of view preset therein in the position comparator 66 to determine whether the remote controllers 55A and 55B, and accordingly, the objects 10a and 10b, are within the photographable angle of view of the taking lens (step S25).

If the objects 10a and 10b are within the photographable angle of view, control proceeds to step S27 and if the objects 10a and 10b are not within the photographable angle of view, control proceeds to step S32 to stop the timer, which started at the commencement of the object distance measurement, and actuate the warning means 59, respectively. Consequently, the operators, i.e., the objects 10a and 10b, are made aware that his or her position is not appropriate so that he or she may move to the appropriate positions.

Figure 20:
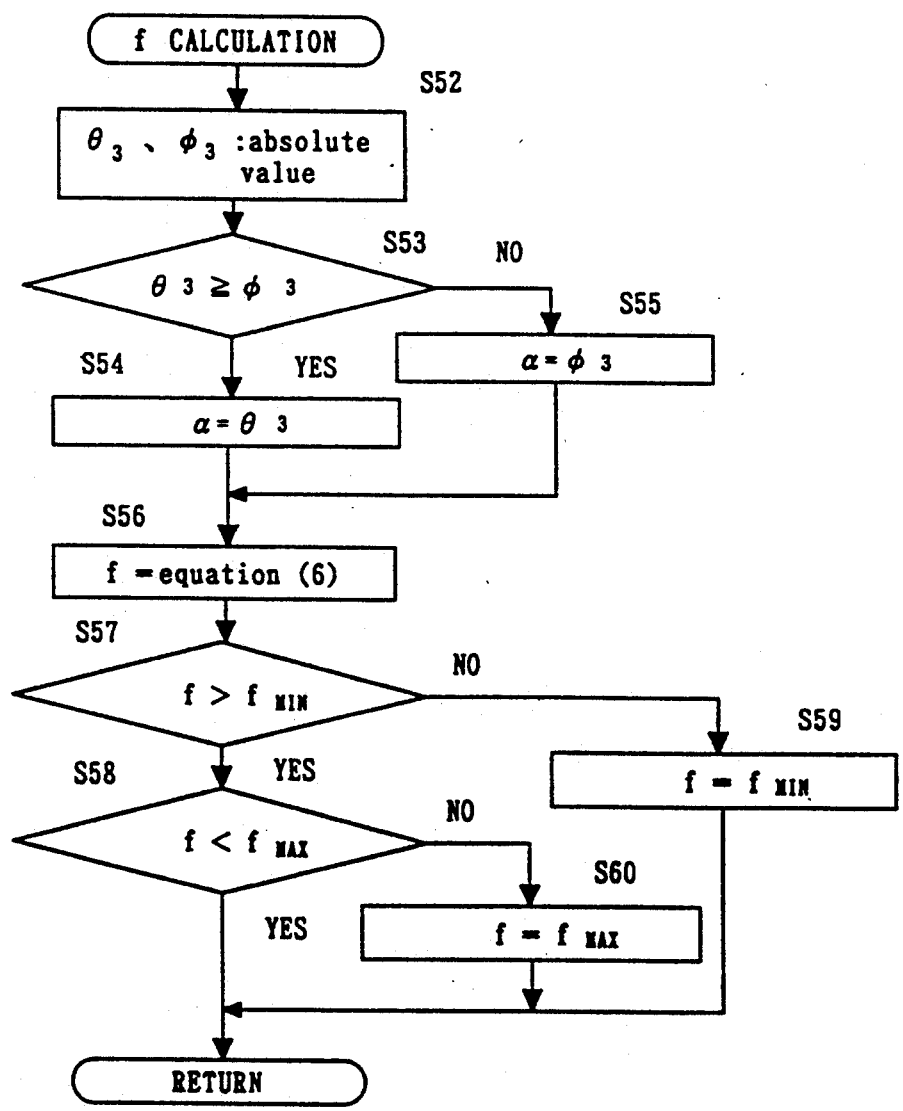
FIG. 20 is a flow chart of a focal length calculating operation in the second embodiment of the present invention.

At step S27, AE photometering is effected by the AE photometering portion 80. Thereafter, control proceeds to step S28, in which the focal length f is calculated. The calculation of the focal length f is carried out as follows (FIG. 20):

In FIG. 20, the absolute values of angles (directions) $\theta_3$ and $\phi_3$ obtained at steps S37 and S41 are obtained at step S52 and compared with each other at step S53. If $\theta_3 \geq \phi_3$, angle $\theta_3$ is set as a photographable range (angle of view) $\alpha$ with respect to the optical axis. Conversely, at step S53, if $\theta_3 < \phi_3$, angle $\phi_3$ is set as the photographable range (i.e., angle of view)$\alpha$. Thereafter, the focal length f is obtained by:

$$f = 43.2/2 \tan \alpha \quad (6)$$

Note that the value "43.2" in the above equation (6) represents a length of a diagonal of 35 mm film to be used, and depends on the kind (size) of the film used in the camera.

At step S57, it is determined whether the calculated focal length f is larger than the shortest focal length $f_{MIN}$ of the zoom lens 31. If the calculated focal length f is larger than the shortest focal length $f_{MIN}$, control proceeds to step S58, and if the calculated focal length f is not larger than the shortest focal length $f_{MIN}$, control proceeds to step S59 at which point the focal length f is set to be identical to the shortest focal length $f_{MIN}$.

At step S58, it is determined whether the calculated focal length f is smaller than the longest focal length $f_{MAX}$ of the zoom lens 31. If the calculated focal length f is smaller than the longest focal length $f_{MAX}$, control is returned, and if the calculated focal length f is not smaller than the longest focal length $f_{MAX}$, control proceeds to step S60 at which point the focal length f is set to be identical to the longest focal length $f_{MAX}$.

Figure 21:
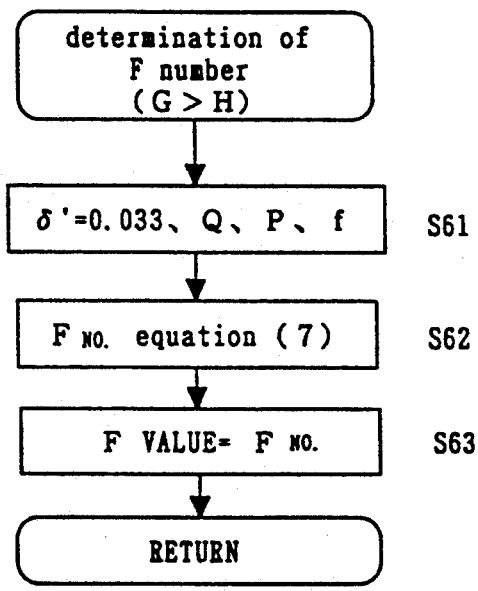
FIG. 21 is a flow chart of a diaphragm value determining operation in the second embodiment of the present invention.

The calculation of the F No. at step S29 is effected as shown in FIG. 21. When a photographer attempts to take a picture in which both the objects 10a and 10b located at different positions are in-focus, the taking lens is focused on the front object 10b closer to the camera body and the diaphragm is controlled so that the rear object 10a is within the depth of field of the far side. The diaphragm value is then calculated and set by the operations of steps S61, S62 and S63.

At step S61, the parameters necessary for the calculation of the diaphragm value are set. Namely, $\delta'=0.033$, and distance data G and H of the objects 10b and 10a are set in Q and P, respectively.

Note that "$\delta$" designates a diameter (i.e., allowable unsharpness) of a small circle of an unsharp virtual image on a film plane and is usually 0.033 for a 35 mm film.

Thereafter, the F No. is calculated by the following equation (7):

$$F\,No. = f^2/\{Q^2/(P-Q)+Q\}' \tag{7}$$

At step S63, the F No. of the camera is set at the calculated F No. The F No. thus obtained may not correspond to one of the predetermined inherent F numbers of the camera. In such a case, the calculated F No. is modified to be one of the inherent F numbers of the camera body so as to satisfy the following relationship:

the inherent F number (i.e., diaphragm value of the camera) ≧ the direct F No.

For example, if the calculated F No. is 3.8, which is not included in the values of the inherent F numbers, the F No. is set to be identical to an inherent F number larger than the calculated F No. (3.8) by one unit, for example 4.0.

Upon completion of the calculation of the focal length f and the F No. by the distance and focal length calculating portion 57, the drive signal is sent to the zooming motor drive circuit 60 from the distance and focal length calculating portion 57. The current focal length of the zoom lens 31 is monitored by the encoder 90 and is then compared with the focal length f calculated by the distance and focal length calculating portion 57. Consequently, the zooming motor 70 is driven in accordance with the output of the zooming motor drive circuit 60 to move the zoom lens 31 in the optical axis direction (step S30). Thereafter, when the releasing is permitted, the sectors of the electromagnetic shutter are opened at a predetermined aperture and for a predetermined time in accordance with the measurement result at step S27 (step S31). Thus, a series of operations are completed.

Prior to the movement of the zoom lens 31 by the zooming motor 70 in the direction of the optical axis O, the focusing operation of the focusing lens 95 is carried out. Namely, the focusing motor drive circuit 65 drives the focusing motor 75 in accordance with the displacement calculated by the AF calculating portion 58 based on the distance data of the distance and focal length calculating portion 57, so that the focusing lens 95, which is originally located at an infinite distance position, is moved in the optical axis direction.

Although the above discussion of the second embodiment has been directed to a picture of collective objects in a row, the present invention is not limited thereto, and can be generally applied to a plurality of objects 10a and 10b having the remote controllers 55A and 55B which are positioned in a variety of manners in front of the camera body.

The following discussion will be addressed to a third embodiment in which the light receiving elements 33b and 34b are made of PSD's, unlike the second embodiment, in which the light receiving elements 33b and 34b are made of CCD's. Since the PSD cannot detect more than one signal at a time, unlike the CCD, the control system thereof is different from that of the second embodiment.

In the following description directed to the third embodiment, it is assumed that a picture of a row of collective objects is taken in a manner similar to the above mentioned second embodiment.

Figure 22:
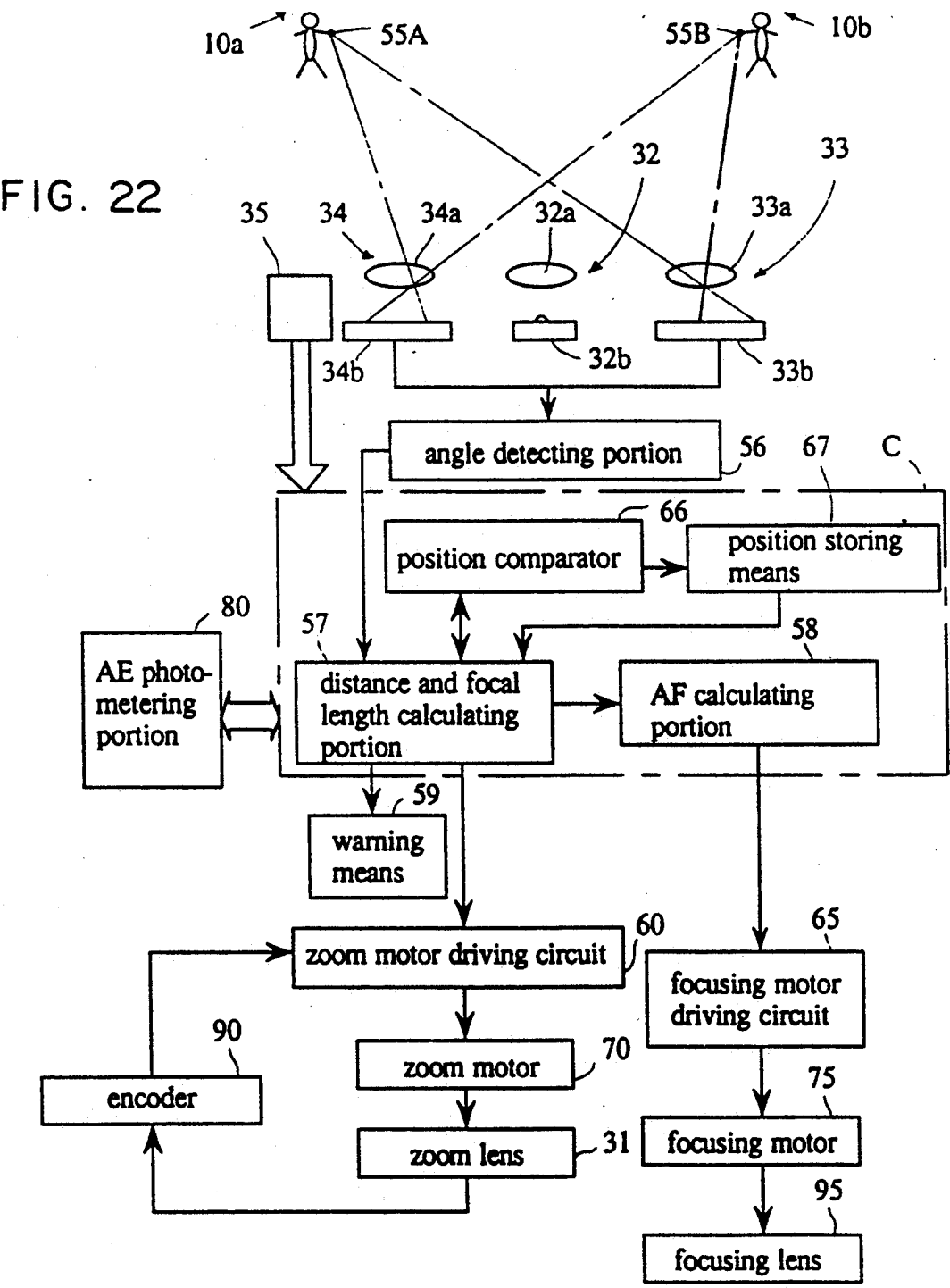
FIG. 22 is a block diagram of a camera according to a third embodiment of the present invention.

The control system in the third embodiment, as shown in FIG. 22, includes a position storing means 67 in addition to the components shown in FIG. 11. If the position comparator 66 judges that the positions of the objects are appropriate, the position storing means 67 stores the data of the positions of the objects.

Figure 23:
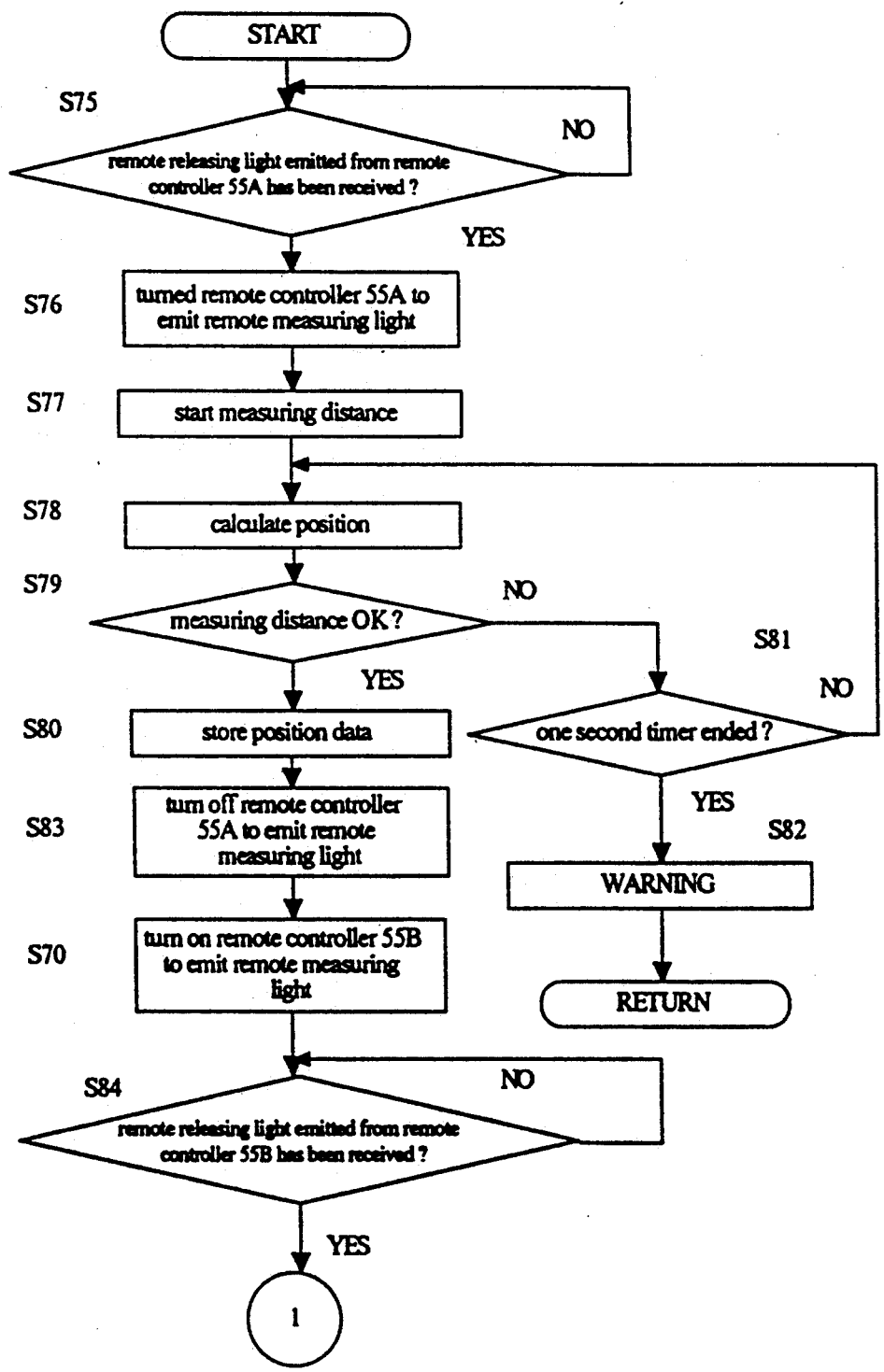
FIGS. 23 and 24 are flow charts of operations of a camera body of the camera of FIG. 22 according to the third embodiment of the present invention.
Figure 24:
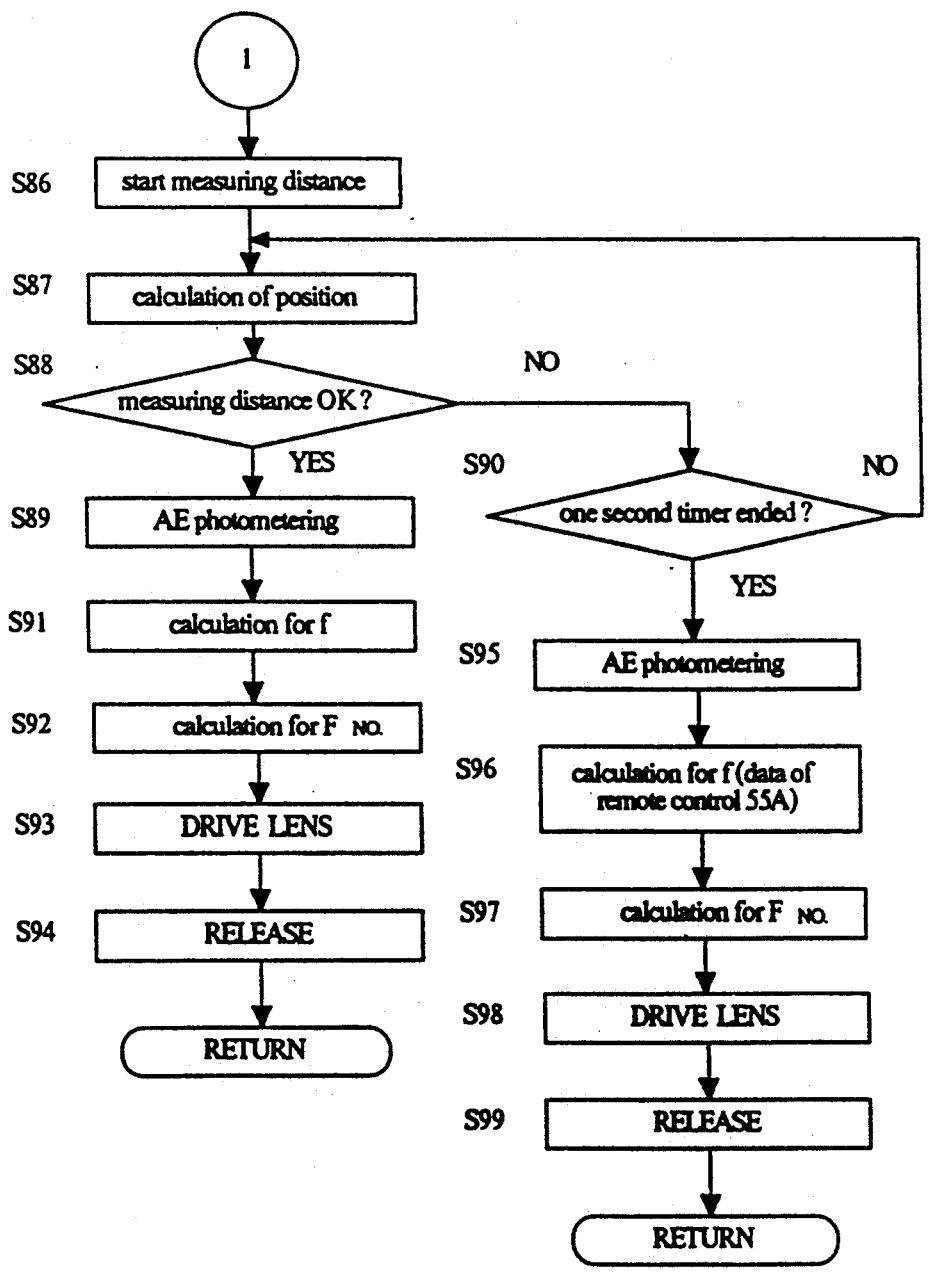
Figure 25:
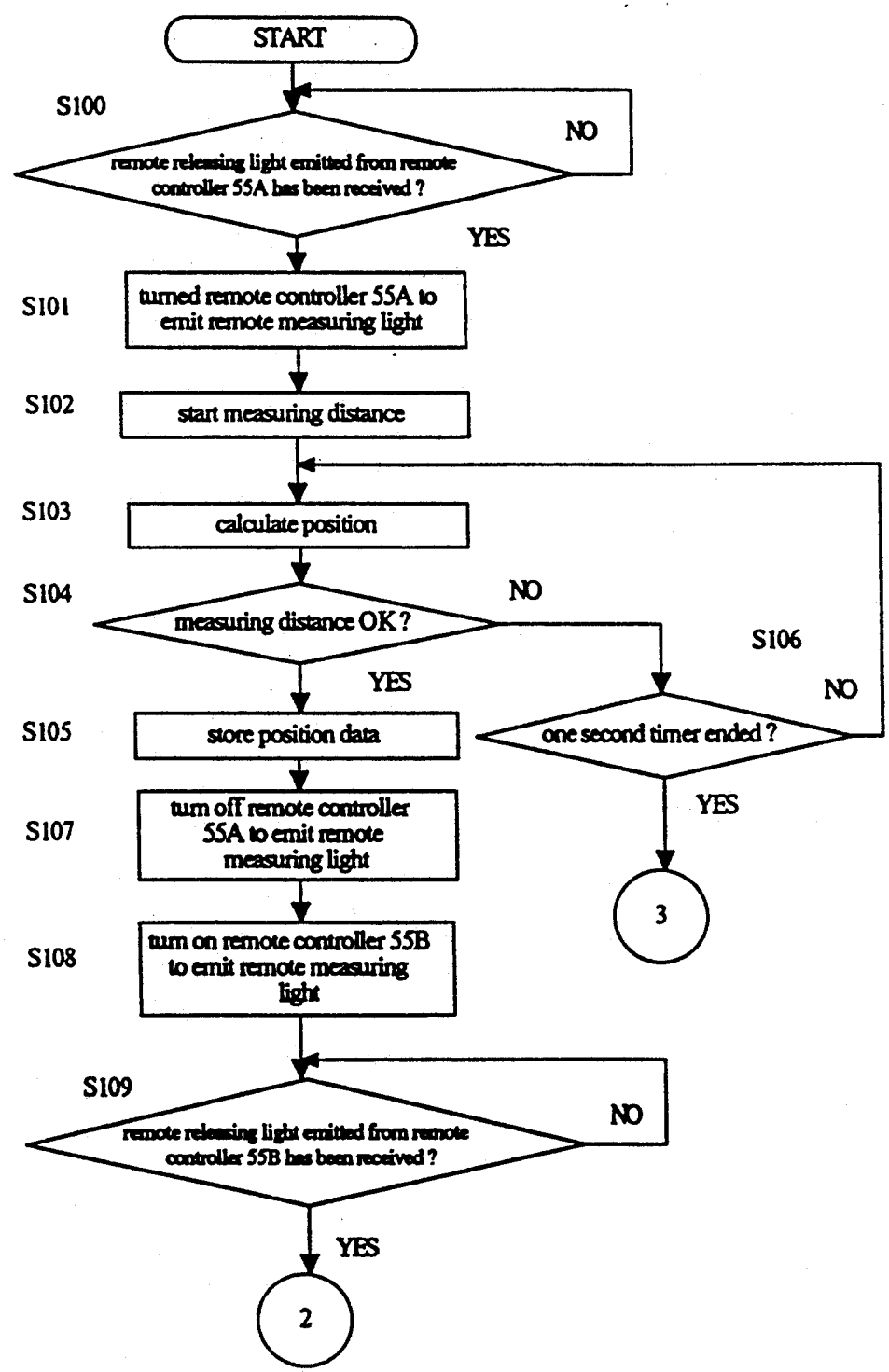
FIGS. 25 and 26 are flow charts of operations of the camera body according to a fourth embodiment of the present invention; and, FIGS. 27 and 28 are flow charts of operations of a camera body according to a fifth embodiment of the present invention.
Figure 26:
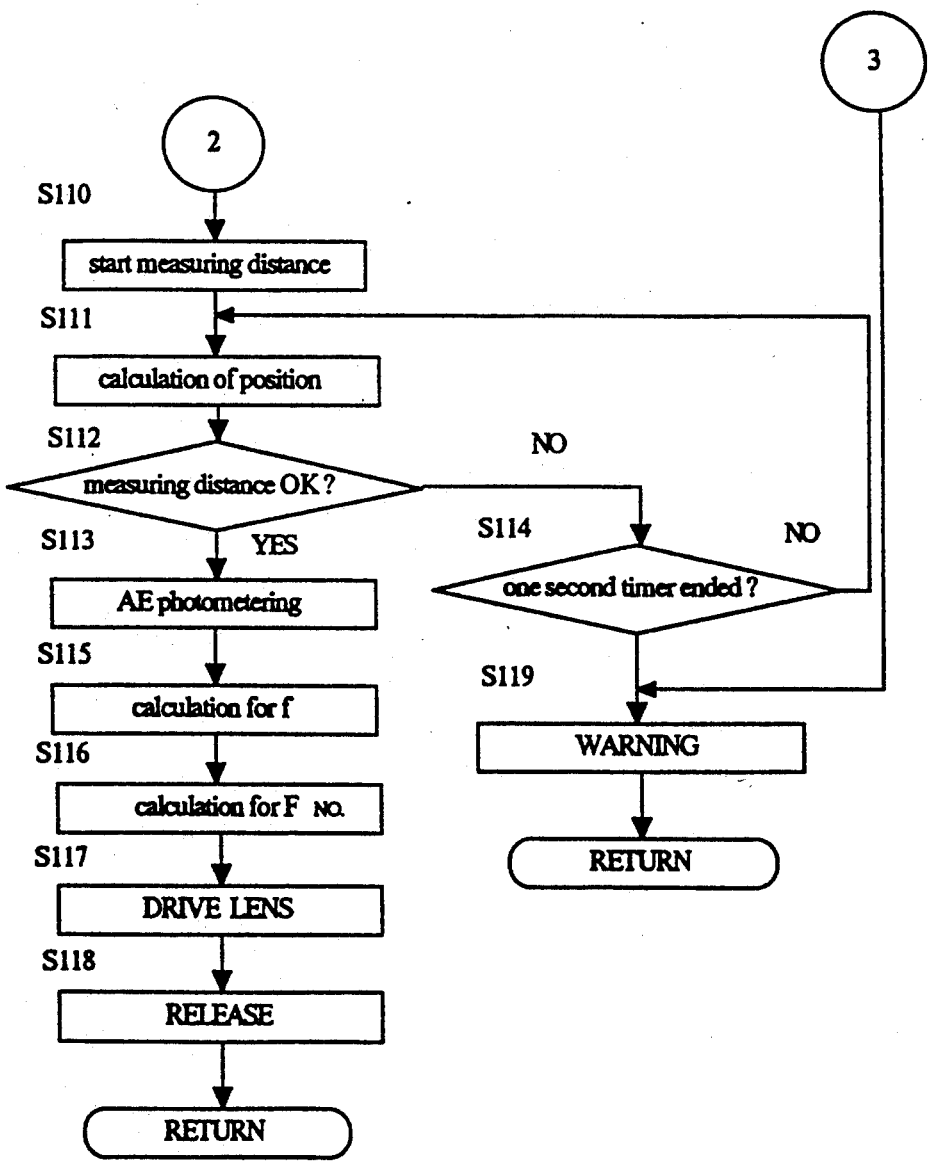

FIGS. 23 and 24 show a flow chart of the operations of the third embodiment.

First, the distance measuring mode selecting switch 42 is actuated to select the remote object distance measuring mode, so that the camera body 30' is in a position to receive the remote releasing light from the remote controller 55A. In this position, when the object 10a holding the remote controller 55A located at the end of the row directs the remote controller 55A to the camera body 30' and actuates the operation button 54a, the remote releasing light is emitted from the light emitting element 53b. When the remote releasing light is received by the releasing light receiver 35 of the camera body, the emission inducing light is emitted from the distance measuring light emitter 32 of the camera body 30'.

The emission inducing light emitted from the distance measuring light emitter 32 is different (i.e., a different pulse signal) from that of the remote controller 55B, so that only the remote controller 55A is induced to emit the remote distance measuring light, since this embodiment employs PSD's, which unlike CCD's, can only detect one signal at a time. When the emission inducing light is received by the light receiving elements 52b of the remote controller 55A, the light emitting element 53b thereof emits the remote distance measuring light (steps S75 and S76).

When the light receiving elements 33b and 34b of the camera body receive the remote measuring light from the remote controller 55A, the one-second timer starts, and the angle detector 56 detects the direction of the remote controller 55A similar to the second embodiment. The distance and focal length calculating portion 57 calculates the position of the remote controller 55A in accordance with the direction data of the angle detector 56 (steps S77 and S78). Thereafter, the position data of the remote controller 55A is compared with the data stored in the position comparator 66 (step S79). If the remote controller 55A, and accordingly the object 10a, are judged to be within a photographable angle of view, the data of the position is stored in the position storing means 67 (step S80).

Conversely, if the object 10a is not within a photographable angle of view at step S79, it is checked whether the set time of the one-second timer has expired. If the set time is over, the warning means 59 issues a warning signal. If the set time is not over, the process returns to step S78.

At step S83, the emission ceasing light is emitted from the measuring light emitting portion 32 of the camera body to stop the remote measuring light which is intermittently emitted from the remote controller 55A. Thereafter, the emission inducing light for the remote controller 55B is emitted, so that the remote controller 55B emits the remote measuring light (step S70). The camera does not operate until it receives the remote releasing light from the remote controller 55B (step S84).

When the object 10b holding the remote controller 55B directs the remote controller 55B to the camera body 30' and operates the same to emit remote releasing light towards the camera, the remote releasing light is received by the releasing light receiving portion 35. As a result, measuring of the object distance commences (i.e., the remote measuring light emitted from the remote controller 55B is detected and the direction thereof is determined). At the same time, the one-second timer starts. In accordance with the direction data from the angle detector 56, the distance and focal length calculating portion 57 calculates the position of the remote controller 55B (step S87). Thereafter, data regarding the position of the remote controller 55B is compared with the data preset in the position comparator 66 (step S88). If the remote controller 55B and, accordingly, the object 10b are judged to be within a photographable angle of view, the AE photometering, the calculation of the focal length f, the calculation of the F No., the drive of the lens, and the releasing operation are performed,. similar to the second embodiment mentioned above (steps S89 and S91-S94) mentioned above.

Conversely, if the object 10b is not within a photographable angle of view at step S88, control proceeds to step S90 to stop the counting operation of the one-second timer. Thereafter, the AE photometering, the calculation of the focal length f for the remote controller 55A, the calculation of the F No., and the drive of the lens are successively carried out to effect the compulsory releasing operation for the object 10a, which is judged to be within the photographable angle of view (steps S95~S99).

The following discussion will be directed to a fourth embodiment of the present invention, in which the releasing operation is effected only when both the remote controllers 55A and 55B are within the photographable angle of view. And, in the case that the remote controllers 55A and 55B are not within the photographable angle of view, a warning is issued.

Also in the fourth embodiment, the light receiving elements 33b and 34b are made of PSD's. When the remote releasing light emitted from the remote controller 55A by the operation by the object 10a at one end of the row is received by the camera body 30' which is in a position to wait for the receipt of the remote releasing light from the remote controller 55A, the emission inducing light is emitted from the measuring light emitting portion 32 of the camera body 30', so that the remote measuring light is intermittently emitted from the remote controller 55A (steps S100 and S101).

When remote measuring light from the remote controller 55A is received by the light receiving elements 33b and 34b of the camera body 30', the angle detector 56 detects the direction of the remote controller 55A. The distance and focal length calculating portion 57 calculates the position of the remote controller 55A in accordance with the direction data of the angle detector 56 (step S103). Thereafter, the position data of the remote controller 55A is compared with the data preset in the position comparator 66 (step S104). If the object 10a is judged to be within a photographable angle of view, the data of the position is stored in the position storing means 67 (step S105).

Conversely, if the object 10a is not within a photographable angle of view, it is checked whether the set time of the one-second timer is over. If the set time is over, the warning means 59 issues a warning signal (step S119). If the set time has not expired, the process returns to step S103 to repeat steps S103 and S104.

At step S107, the emission ceasing light is emitted from the measuring light emitting portion 32 of the camera body to stop the remote measuring light from being emitted from the remote controller 55A. Thereafter, the emission inducing light for the remote controller 55B is emitted, so that the remote controller 55B emits the remote measuring light (step S108). The camera does not operate until it receives the remote releasing light from the remote controller 55B (step S109).

When the object 10b holding the remote controller 55B directs the remote controller 55B to the camera body 30' and operates the same to emit the remote releasing light toward the camera, the remote releasing light is received by the releasing light receiving portion 35. As a result, the measuring of object distance commences based on the remote measuring light which is discontinuously emitted from the remote controller 55B to detect the direction thereof (step S110). At the same time, the one-second timer starts. In accordance with the direction data from the angle detector 56, the distance and focal length calculating portion 57 calculates the position of the remote controller 55B (step S111). Thereafter, the data on the position of the remote controller 55B is compared with the data preset in the position comparator 66 (step S112). If the remote controller 55B and, accordingly, the object 10b are judged to be within a photographable angle of view, the AE photometering, the calculation of the focal length f, the calculation of the F No., the drive of the lens, and the releasing operation are performed (steps S113 and S115-S118) similar to the second and third embodiments mentioned above.

Conversely, if the object 10b is not within a photographable angle of view at step S112, control proceeds to step S114. After the set time of the one-second timer is over, the warning means 59 issues a warning signal (step S119).

In the third and fourth embodiments mentioned above, both the remote controllers 55A and 55B can independently transmit the remote measuring light (distance signal) and the remote releasing light (release command signal) and can automatically output the remote measuring light, as mentioned above. Alternatively, it is possible to selectively permit and prohibit the output of the remote measuring light from the remote controllers. Furthermore, to simplify the construction of the remote controllers, it is possible to also use the remote distance signal as the release command signal. In this case, the operation at step S84 can be omitted, since it can be effected by the operations in the loop of steps S87, S88, S90 and S87 (step S104 can be omitted in the fourth embodiment). In the simplified remote controllers, the shutter is automatically released when the camera is in a position to take a picture after the camera receives the distance signal from the remote controller 55B.

Figure 27:
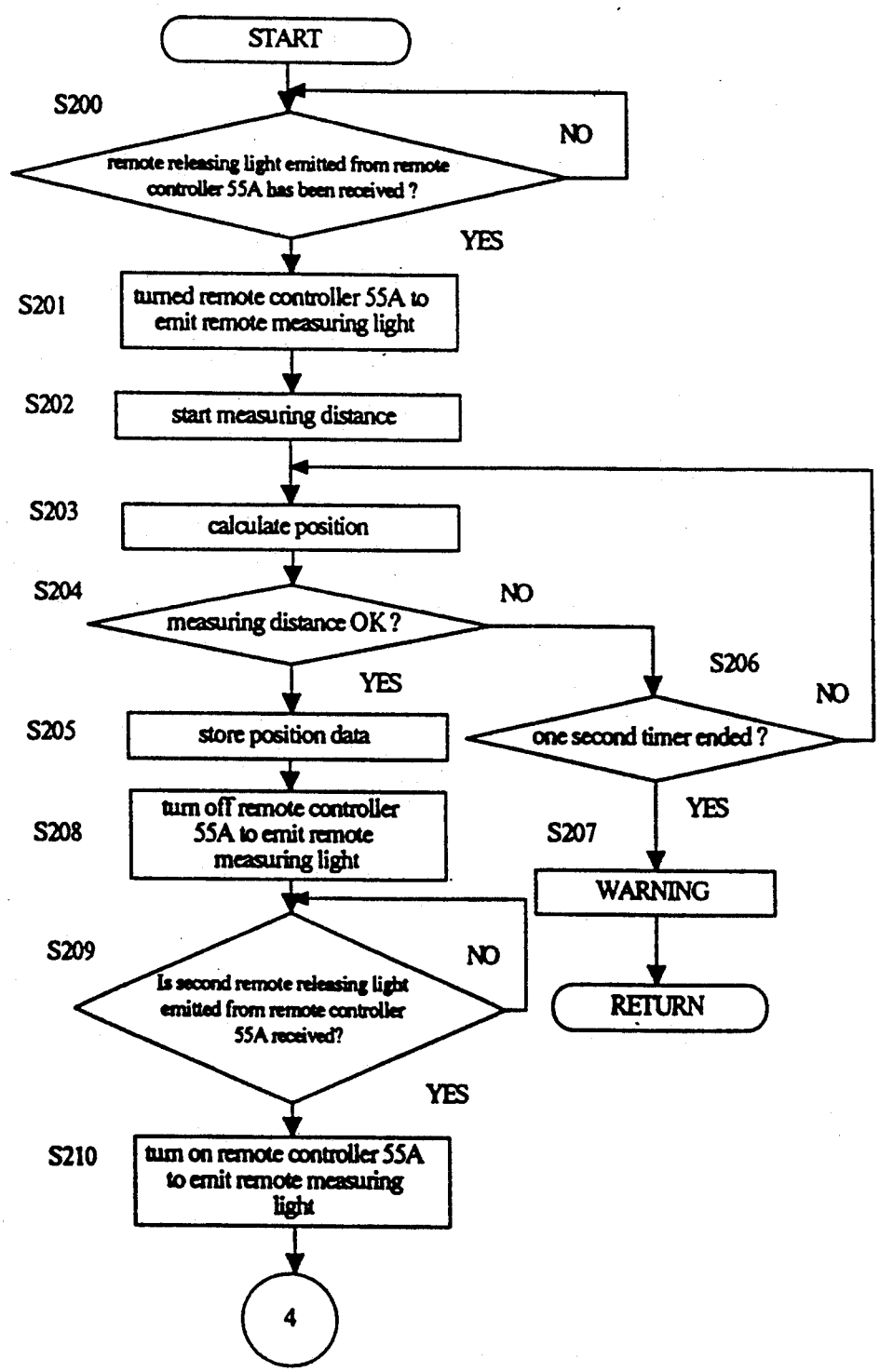
Figure 28:
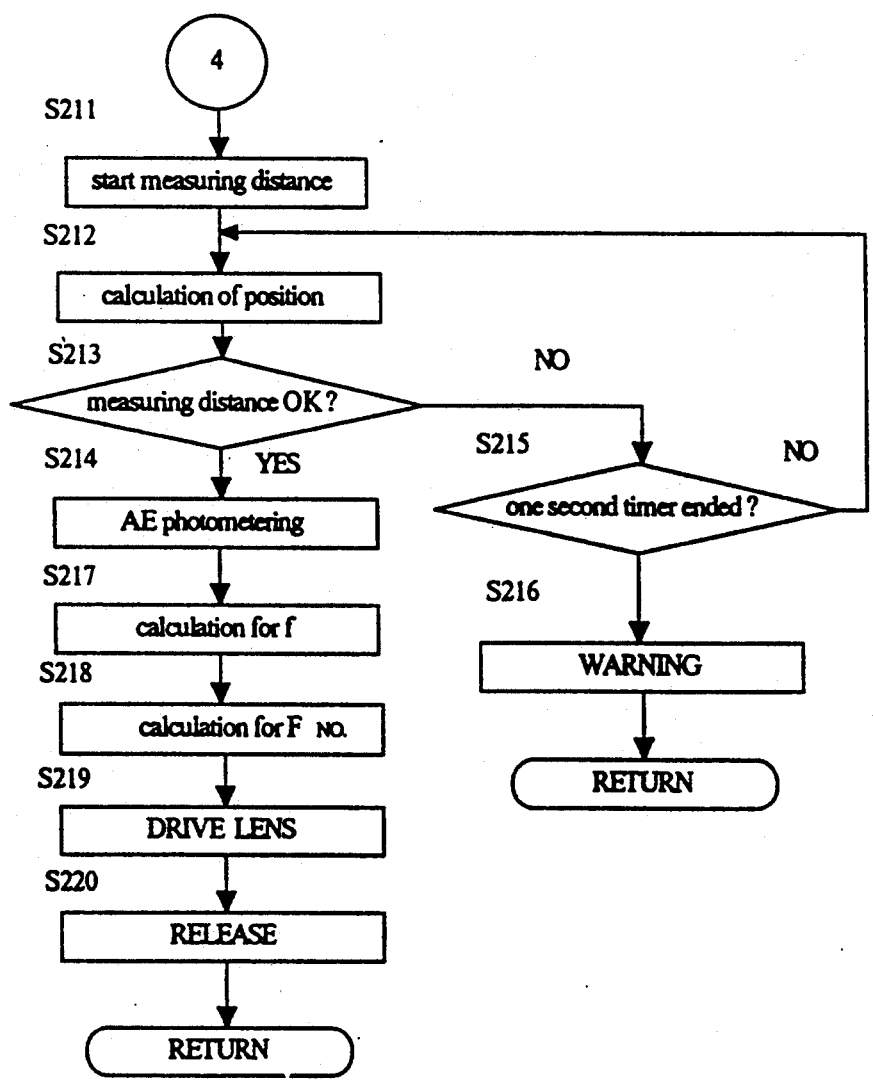

A fifth embodiment of the present invention will be discussed below with reference to FIGS. 27 and 28, in which the object distance is measured only by one of the remote controllers 55A or 55B, for example, the remote controller 55A, unlike the second through fourth embodiments in which the measurement is effected by both of the remote controllers 55A and 55B. In the fifth embodiment, the light receiving elements 33b and 34b are made of PSD's.

The distance measuring mode selecting switch 42 is actuated to select the remote object distance measuring mode, so that the camera body 30' is in a position to receive the remote releasing light from the remote controller 55A (step S200). In this position, when the remote releasing light (first remote releasing light) emitted from the remote controller 55A is received by the camera body 30', the emission inducing light is emitted from the measuring light emitting portion 32 of the camera body 30', so that the remote measuring light is in turn emitted from the remote controller 55A (step S201).

When the remote measuring light, emitted by the remote controller 55A, is received by the light receiving elements 33b and 34b of the camera body 30', the angle detector 56 detects the direction of the remote controller 55A. The distance and focal length calculating portion 57 calculates the position of the remote controller 55A in accordance with the direction data of the angle detecting portion 56 (steps S202, S203). Thereafter, the position data of the remote controller 55A is compared with the data preset in the position comparator 66. If the object 10a is judged to be within a photographable angle of view, the positional data is stored in the position storing means 67. Conversely, if the object 10a is not within a photographable angle of view, it is determined whether the set time of the one-second timer has expired. If the set time has expired, the warning means 59 issues a warning signal (steps S204, S206, S207). If the set time has not ended, the process returns to step S203, so as to repeat steps S203 and S204.

Thereafter, at step S208, the emission ceasing light is emitted from the measuring light emitting portion 32 of the camera body to stop the remote measuring light emitted from the remote controller 55A.

Thereafter, the remote controller 55A is transferred to the other object 10b. Consequently, the object 10b actuates the remote controller 55A to emit the second remote releasing light toward the camera body 30'. When the second remote releasing light emitted from the remote controller 55A by the operation by the object 10b is received by the releasing light receiver 35 of the camera body 30', the emission inducing light is emitted from the measuring light emitting portion 32 of the camera body 30', so that the remote measuring light is emitted from the remote controller 55A. When the remote measuring light from the remote controller 55A is received by the camera body 30', the angle detecting portion 56 detects the direction of the remote controller 55A. The distance and focal length calculating portion 57 calculates the position of the remote controller 55A held by the object 10b in accordance with the direction data of the angle detecting portion 56 (steps S209~S212).

Thereafter, the positional data of the remote controller 55A is compared with the data preset in the position comparator 66 (step S213). If the object 10b is judged to be within a photographable angle of view, the AE photometering (step S214), the calculation of the focal length f, the calculation of the F No., the drive of the lens, and the releasing operation are performed (steps S217~S220).

Conversely, if the object 10b is not within a photographable angle of view at step S213, it is determined whether the set time of the one-second timer has expired. If the set time has expired, the warning means 59 generates the warning signal (steps S215, S216). If the set time has not expired, the process returns to step S212.

The warning signal mentioned in the first through fifth embodiments may be realized by a sound generator, a light generator, a combination of the two, etc.

As can be understood from the foregoing, according to the present invention, the object distance is measured in accordance with the the measuring light emitted from the remote controller held by the object (i.e., photographer), so that the focal length of the zoom lens can be adjusted in accordance with the object distance. Therefore, when the photographer takes his or her picture, the taking lens can be precisely focused on the object, and the framing can be effected so that the object is positioned within the photographable range of the camera.

The provision of the second focal length calculating means in the camera body for calculating the focal length of the zoom lens makes it possible to take a picture of an object whose size is constant relative to the film, in accordance with the distance data calculated by the distance calculating means, regardless of the distance between the camera body and the object(s) holding the remote controller(s).

Furthermore, the provision of the focal length selecting means in the camera body makes it possible to compare the focal length of the zoo lens calculated by the first focal length calculating means and the focal length of the zoom lens calculated by the second focal length calculating means to thereby select the focal length that corresponds to the wider angle of view of the zoom lens.

Furthermore, according to the present invention, the focal length mode selecting means provided in the camera body can select one of the three modes, i.e., the first focal length mode in which the focal length of the zoom lens is set to be identical to the focal length calculated by the first focal length calculating means, the second focal length mode in which the focal length of the zoom lens is set to be identical to the focus length calculated by the second focal length calculating means, and the third focal length mode in which the focal length of the zoom lens is set to be identical to the focal length selected by the focal length selecting means.

The photographic mode selecting means can select and set one of the two photographic modes, i.e., the first photographic mode in which the zoom lens is moved in the optical axis direction by the zoom lens driving means, and the second photographic mode in which the zoom lens is manually moved in the optical axis direction.

The warning means generates the warning signal when the distance data is not calculated by the distance calculating means within a predetermined time.

Furthermore, according to the present invention, the light receiver can be constructed so as to receive the bundles of rays emitted from the remote controllers at two different positions. Consequently, upon taking a picture of a row of objects, two of the objects hold the remote controllers and actuate the respective remote controllers to emit the bundles of rays from their respective. The direction detecting means detects the directions of the bundles of rays emitted from the remote controllers and received by the light receivers. The distance calculating means calculates the object distance data in accordance with the directions of the bundles of rays detected by the direction detecting means. Thus, a picture of a plurality of objects, all of which are in-focus, can be taken.

The position comparing means can check whether the objects holding the respective remote controllers at different positions are within the photographable angle of view of the zoom lens. If one or both of the objects at different positions is or are not within the photographable angle of view of the zoom lens, the the warning means generates a warning signal, so that the photographer can notice the same.

We claim:

1. A camera having a focusing function that is operable in accordance with distance data of an object to be photographed, said distance data being detected using a measuring light, said camera comprising:
   a remote controller that is separate from a camera body of said camera and which is capable of being actuated from an object side to initially emit said measuring light from said remote controller toward said camera body;
   at least two light receivers on said camera body that receive said measuring light emitted by said remote controller;
   means for detecting a direction of said measuring light received by said at least two light receivers; and
   means for calculating distance data of said object in accordance with said direction of said measuring light detected by said direction detecting means.

2. A camera according to claim 1, further comprising a zoom lens.

3. A camera according to claim 2, further comprising a first focal length calculating means in said camera body for calculating a focal length of said zoom lens so as to locate said object to be taken within an angle of view of said zoom lens, in accordance with said distance data from said distance calculating means.

4. A camera according to claim 3, further comprising a second focal length calculating means in said camera body for calculating a focal length of said zoom lens so as to maintain a predetermined size of an image of said object with respect to a film in accordance with said distance data of said distance calculating means, regardless of said distance of said object from said camera body.

5. A camera according to claim 4, further comprising a zoom lens driving means in said camera body for moving said zoom lens in a direction of an optical axis thereof so as to obtain a predetermined focal length.

6. A camera according to claim 5, wherein said predetermined focal length is identical to said focal length calculated by said first focal length calculating means.

7. A camera according to claim 5, wherein said predetermined focal length is identical to said focal length calculated by said second focal length calculating means.

8. A camera according to claim 5, wherein further comprising a focal length selecting means in said camera body for comparing said focal length calculated by said first focal length calculating means and said focal length calculated by said second focal length calculating means to select a focal length which gives a wide angle of view of said zoom lens.

9. A camera according to claim 8, wherein said predetermined focal length is identical to said focal length selected by said focal length selecting means.

10. A camera according to claim 5, further comprising a focal length mode selecting means in said camera body for selecting a mode in which said focal length of said zoom lens is said focal length calculated by said first focal length calculating means, a mode in which said focal length of said zoom lens is said focal length calculated by said second focal length calculating means, or a mode in which said focal length of said zoom lens is said focal length selected by the focal length selecting means.

11. A camera according to claim 10, wherein said predetermined focal length is said focal length selected by said focal length mode selected means.

12. A camera according to claim 11, further comprising a taking mode selecting means for selecting a mode in which said zoom lens is moved by said zoom lens driving means in said optical axis direction thereof, or a mode in which said zoom lens is manually moved in said optical axis direction thereof.

13. A camera according to claim 1, further comprising means for warning that said distance data is not being outputted by said distance calculating means within a predetermined period of time.

14. A camera according to claim 13, wherein said warning means comprises a warning sound generator.

15. A camera according to claim 13, wherein said warning means comprises a warning light generator.

16. An autofocus camera system, comprising:
   a camera body having at least two light receivers thereon which are separated from each other by a predetermined optical base length;
   a remote controller that is separate from said camera body and which is capable of being actuated from an object side to initially emit a measuring light from said remote controller toward said at least two light receivers; and
   a distance calculating means provided in said camera body for calculating a distance of said remote controller from said camera body in accordance with data of said measuring light which is received by said at least two light receivers and said optical base length.

17. A camera having a focusing function that is operable in accordance with distance data of an object to be photographed, said data being detected by using a measuring light, said camera comprising:
- a remote control that is separate from a camera body of said camera and which is capable of being actuated from an object side to initially emit a measuring light from said remote control toward said camera body, in at least two different positions;
- at least two light receivers on said camera body that receive said measuring light emitted by said remote control means;
- means for detecting a direction of said measuring light that is received by said at least two light receivers; and
- means for calculating distance data of said object in accordance with said direction of said measuring light detected by said direction detecting means.

18. A camera according to claim 17, wherein said remote control means comprises a remote controller which is moved between two different positions.

19. A camera according to claim 17, wherein said remote control means comprises two separate remote controllers.

20. A camera according to claim 17, further comprising means for warning said distance data is not being outputted by said distance calculating means within a predetermined period of time.

21. A camera according to claim 20, wherein said warning means comprises a warning sound generator.

22. A camera according to claim 20, wherein said warning means comprises a warning light generator.

23. A camera according to claim 18, wherein said at least two light receivers receive bundles of rays emitted by said remote controller in two different directions.

24. A camera according to claim 17, wherein said at least two light receivers receive bundles of rays emitted by remote controllers in two different directions.

25. A camera according to claim 19, wherein said at least two light receivers receive bundles of rays emitted by said two separate remote controllers.

26. A camera according to claim 18, wherein said direction detecting means detects said directions of said bundles of rays emitted by said remote controller from different positions, in accordance with signals outputted by said remote controller and received by said at least two light receivers.

27. A camera according to claim 19, wherein said direction detecting means detects said directions of said bundles of rays emitted from two remote controllers, in accordance with signals outputted by said two separate remote controllers and received by said at least two light receivers.

28. A camera according to claim 17, wherein said at least two light receivers comprise spaced CCD's that are provided on right and left front wall portions of said camera body.

29. A camera according to claim 17, wherein said at least two light receivers comprise spaced PSD's that are provided on right and left front wall portions of said camera body.

30. A camera according to claim 23, wherein said at least two light receivers comprise spaced CCD's that are provided on right and left front wall portions of said camera body.

31. A camera according to claim 25, wherein said at least two light receivers comprise spaced PSD's that are provided on right and left front wall portions of said camera body.

32. A camera according to claim 23, further comprising a position comparing means determining whether said remote controller in two different positions is within a predetermined angle of view of a zoom lens, in accordance with said distance data that is calculated by said distance calculating means.

33. A camera according to claim 25, further comprising a position comparing means for determining whether said two remote controllers are within a predetermined angle of view of a zoom lens when located at said two different positions, in accordance with said distance data that is calculated by said distance calculating means.

34. A camera according to claim 24, further comprising a timer, said timer being started upon a commencement of an object distance measurement.

35. A camera according to claim 34, further comprising means for compulsively releasing a shutter when said distance calculating means calculates distance data of one of said two separate remote controllers and when a counting operation of said timer is completed.

36. A camera according to claim 32, further comprising a warning means that generates a warning signal when said position comparing means determines that a remote controller provided at one of said two different positions is not within a predetermined angle of view of a zoom lens.

37. A camera according to claim 33, further comprising a warning means that generates a warning signal when said position comparing means determines that one of said two separate remote controllers provided at said two different positions is not within a predetermined angle of view of a zoom lens.

38. A camera according to claim 33, further comprising a warning means that generates a warning signal when said position comparing means determines that both of said two separate remote controllers are not within a predetermined angle of view of a zoom lens.

39. A camera according to claim 33, further comprising a warning means that generates a warning signal when said position comparing means determines that both of said two separate remote controllers are not within a predetermined angle of view of a zoom lens.

40. A camera according to claim 36, wherein said warning means comprises a warning sound generator.

41. A camera according to claim 36, wherein said warning means comprises a warning light generator.

42. A camera according to claim 37, wherein said warning means comprises a warning sound generator.

43. A camera according to claim 37, wherein said warning means comprises a warning light generator.

44. A camera according to claim 38, wherein said warning means comprises a warning sound generator.

45. A camera according to claim 38, wherein said warning means comprises a warning light generator.

46. A camera having a focusing function that is operable in accordance with distance data of an object to be photographed, said distance data being detected by using a measuring light and calculated by a distance calculating means, said camera comprising:
- a remote control means that is separate from a camera body of said camera and which is capable of being actuated from an object side to emit remote releasing light toward said camera body;

an emission inducing means which emits an emission inducing light upon receipt of said remote releasing light emitted by said remote control means;

said remote control means further comprising means for intermittently emitting remote measuring light upon receipt of said emission inducing light emitted by said emission inducing means; and, an emission ceasing means which emits an emission ceasing light toward said remote control means to cease said emission of said remote measuring light when said distance data is calculated by said distance calculating means.

47. A camera, comprising:

a remote controller that is separate from a camera body of said camera and which is capable of being actuated from an object side to initially emit a measuring light from said remote controller toward said camera body;

at least two, light receivers on said camera body that receive said measuring light emitted by said remote controller;

means for detecting a direction of said measuring light that is received by said at least two light receivers; and means for calculating a focal length of a lens associated with said camera that corresponds to a position of an object to be photographed having said remote controller in accordance with said direction of said measuring light detected by said direction detecting means, such that said object to be photographed is imaged within a film frame by said lens.

* * * * *

UNITED STATES PATENT AND TRADEMARK OFFICE
CERTIFICATE OF CORRECTION

PATENT NO. : 5,247,327
DATED : September 21, 1993
INVENTOR(S) : SHINYA SUZUKA et al.

It is certified that error appears in the above-indentified patent and that said Letters Patent is hereby corrected as shown below:

At column 24, line 2 (claim 4, line 5) of the printed patent, insert ---,--- after "film".

At column 24, line 17 (claim 8, line 1) of the printed patent, delete "wherein".

At column 25, line 5 (claim 17, line 5) of the printed patent, insert ---means--- after "control".

At column 25, line 8 (claim 17, line 8) of the printed patent, insert ---means--- after "control".

At column 25, line 26 (claim 20, line 2) of the printed patent, insert ---that--- after "warning".

At column 26, line 4 (claim 32, line 2) of the printed patent, insert ---for--- after "means".

At column 28, line 3 (claim 47, line 7) of the printed patent, change "two," to ---two---.

Signed and Sealed this

Fifteenth Day of October, 1996

Attest:

BRUCE LEHMAN

*Attesting Officer*    *Commissioner of Patents and Trademarks*